United States Patent
Zayhowski et al.

(10) Patent No.: US 9,515,451 B2
(45) Date of Patent: Dec. 6, 2016

(54) SYSTEMS AND METHODS FOR LIGHT AMPLIFICATION

(71) Applicants: John J. Zayhowski, Cambridge, MA (US); Dale H. Martz, Medford, MA (US)

(72) Inventors: John J. Zayhowski, Cambridge, MA (US); Dale H. Martz, Medford, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

(21) Appl. No.: 15/009,102

(22) Filed: Jan. 28, 2016

(65) Prior Publication Data
US 2016/0226210 A1    Aug. 4, 2016

Related U.S. Application Data

(60) Provisional application No. 62/109,155, filed on Jan. 29, 2015.

(51) Int. Cl.
| | |
|---|---|
| H01S 3/067 | (2006.01) |
| H01S 3/08 | (2006.01) |
| H01S 3/16 | (2006.01) |
| H01S 3/094 | (2006.01) |
| H01S 3/00 | (2006.01) |

(52) U.S. Cl.
CPC ........... *H01S 3/0804* (2013.01); *H01S 3/0085* (2013.01); *H01S 3/06733* (2013.01); *H01S 3/06754* (2013.01); *H01S 3/06762* (2013.01); *H01S 3/094003* (2013.01); *H01S 3/1618* (2013.01)

(58) Field of Classification Search
CPC ............... H01S 3/0085; H01S 3/0804; H01S 3/06733; H01S 3/06762; H01S 3/06754
See application file for complete search history.

(56) References Cited

U.S. PATENT DOCUMENTS

| | | |
|---|---|---|
| 7,764,720 B1 | 7/2010 | Bronder et al. |
| 8,345,348 B1 | 1/2013 | Savage-Leuchs |
| 8,462,426 B1 | 6/2013 | Dajani et al. |
| 8,767,286 B2 | 7/2014 | Savage-Leuchs et al. |
| 2011/0091155 A1 | 4/2011 | Yilmaz et al. |
| 2015/0138630 A1 | 5/2015 | Honea et al. |

OTHER PUBLICATIONS

P. Weβels, P. Adel, M. Auerbach, D. Wandt, C. Fallnich, "Novel suppression scheme for Brillouin scattering", Optics Express vol. 12, No. 19, pp. 4443-4448 (2004).*
International Search Report and Written Opinion mailed Apr. 21, 2016 from corresponding International Application No. PCT/US16/15329, 9 pp.

(Continued)

*Primary Examiner* — Eric Bolda
(74) *Attorney, Agent, or Firm* — Cooley LLP

(57) ABSTRACT

A system for optical amplification includes an optical fiber with a core containing a gain medium surrounded by a cladding, a seed light source, a control light source, and a pump source. The seed light source transmits seed light, at a first wavelength and having a first linewidth greater than 100 MHz, into the core of the fiber. The control light source transmits control light, at a second wavelength shorter than the first wavelength, into the core where it interacts with the pumped gain medium so as to reduce the peak rate of heat deposition per unit length along the fiber. The control light has a second linewidth greater than 100 MHz. The pump source transmits pump light at a pump wavelength, shorter than the second wavelength, into the fiber so as to pump the gain medium and amplify the seed light.

24 Claims, 16 Drawing Sheets

(56) References Cited

OTHER PUBLICATIONS

Broderick, N. G. R. et al., "Large mode area fibers for high power applications," Opt. Fiber Technol. 5, 185-196 (1999).
Dajani, I. et al., "Investigation of Nonlinear Effects in Multitone-Driven Narrow-Linewidth High-Power Amplifiers," IEEE J. Sel. Topics Quantum Electron., 15(2), 406-414 (2009).
Dong, L. et al., "All-glass large-core leakage channel fibers," IEEE Sel. Top. Quantum Electron. 15(1), 47-53 (2009).
Eidam, T. et al., "Preferential gain photonic-crystal fiber for mode stabilization at high average powers," Opt. Express 19(9), 8656-8661 (2011).
Gapontsev, V. et al., "2 kW CW Ytterbium fiber laser with record diffraction-limited brightness," in CLEO (2005), vol. 12, 1 p.
Hansen, K. R. et al., "Impact of gain saturation on the mode instability threshold in high-power fiber amplifiers," Opt. Express 22(9), 11267-11278 (2014).
Henry, L. J. et al., "Enhancement of output power from narrow linewidth amplifiers via two-tone effect—high power experimental results," Opt. Express 18, 23939-23947 (2010).
Jauregui, C. et al., "High-power fibre lasers," Nat. Photonics 7(11), 861-867 (2013).
Jauregui, C. et al., "Passive mitigation strategies for mode instabilities in high-power fiber laser systems," Opt. Express 21(16), 19375-19386 (2013).
Jauregui, C. et al., "Physical origin of mode instabilities in high-power fiber laser systems," Opt. Express 20(12), 12912-12925 (2012).
Jauregui, C. et al., "Simplified modelling the mode instability threshold of high power fiber amplifiers in the presence of photodarkening," Optics Express, vol. 23, No. 16, 20203-20218 (Jul. 27, 2015).
Jeong, Y.-C. et al., "Multi-kilowatt Single-mode Ytterbium-doped Large-core Fiber Laser," J. Opt. Soc. Korea 13(4), 416-422 (2009).
Jiang, Z. et al., "Transverse Modes in Large-Mode-Area Fibers", Ph.D. Thesis, University of Rochester, (2009), 125 pp.
Knight, J. C. et al., "Large mode area photonic crystal fibre," Electron. Lett. 34, 1347-1348 (1998).
Koplow, J. P. et al., "Single-mode operation of a coiled multimode fiber amplifier," Opt. Lett. 25(7), 442-444 (2000).
Laurila, M. et al., "Distributed mode filtering rod fiber amplifier delivering 292W with improved mode stability," Opt. Express 20(5), 5742-5753 (2012).
Limpert, J. et al., "Yb-doped large-pitch fibres: effective single-mode operation based on higher-order mode delocalisation," Light: Sci. Appl. 1(4),5 pp. (2012).
Liu, C. et al., "Effectively single-mode chirally-coupled core fiber," in Advanced Solid-State Photonics, OSA Technical Digest Series (CD), paper ME2 (2007), 3 pp.
Naderi, S. et al., "Investigations of modal instabilities in fiber amplifiers through detailed numerical simulations," Opt. Express 21(13), 16111-16129 (2013).
Otto, H.-J. et al., "Controlling mode instabilities by dynamic mode excitation with an acousto-optic deflector," Opt. Express 21(14), 17285-17298 (2013).
Otto, H.-J. et al., "Scaling the mode instability threshold with multicore fibers," Opt. Lett. 39(9), 2680-2683 (2014).
Pooler, V. K. et al., "3kW single-mode direct diode-pumped fiber laser," in Proc. SPIE 8961, Fiber Lasers XI: Technology, Systems, and Applications, 89610V (2014), 6 pp.
Preußler, S. et al., "Brillouin scattering gain bandwidth reduction down to 3.4MHz", Optics Express, vol. 19, No. 9, 8565-8570 (2011).
Robin, C. et al., "Modal instability-suppressing, single-frequency photonic crystal fiber amplifier with 811 W output power," Opt. Lett. 39(3), 666-669 (2014).
Smith, A. V. et al., "Increasing mode instability thresholds of fiber amplifiers by gain saturation," Opt. Express 21(13), 15168-15182 (2013).
Smith, A. V. et al., "Mode instability in high power fiber amplifiers," Opt. Express 19(11), 10180-10192 (2011).
Ward, B. et al., "Origin of thermal modal instabilities in large mode area fiber amplifiers," Opt. Express 20(10), 11407-11422 (2012).
White, J. O. et al., "Suppression of stimulated Brillouin scattering in optical fibers using a linearly chirped diode laser," vol. 20, No. 14 / Optics Express, 15872 (2012).
Wong, W. S. et al., "Breaking the limit of maximum effective area for robust single-mode propagation in optical fibers," Opt. Lett. 30(21), 2855-2857 (2005).

* cited by examiner

SYSTEMS AND METHODS FOR LIGHT AMPLIFICATION

CROSS-REFERENCE TO RELATED APPLICATIONS

This application claims priority to U.S. provisional application Ser. No. 62/109,155, filed Jan. 29, 2015, entitled "TECHNIQUE FOR MITIGATING MULTIMODE INSTABILITIES IN HIGH-POWER LARGE-MODE-AREA FIBER AMPLIFIERS," which is hereby incorporated herein by reference in its entirety.

GOVERNMENT SUPPORT

This invention was made with Government support under Contract No. FA8721-05-C-0002 awarded by the U.S. Air Force. The Government has certain rights in the invention.

BACKGROUND

The useful output power P or energy E (E=Pτ, τ is the duration of the optical pulse in a pulsed system) from fiber amplifiers can be limited by nonlinear optical interactions in the fiber, such as self-phase modulation (SPM), cross-phase modulation (XPM), four-wave mixing (FWM), stimulated Raman scattering (SRS), and stimulated Brillouin scattering (SBS). These nonlinear interactions become detrimental when the intensity I (I=P/A, A is the effective cross-sectional area of the optical mode in the fiber) of the light propagating in the fiber reaches a threshold value. Standard single-mode fibers normally have an effective mode area below 100 $\mu m^2$. Large-mode-area (LMA) fibers can have an effective mode area that reaches hundreds or even thousands of $\mu m^2$. The large mode area of LMA fibers maintains a relatively low intensity I within the fibers while increasing the total output power P or energy E. Therefore, using LMA fibers can raise the threshold for the detrimental nonlinear optical interactions that limit the useful output power of an amplifier.

For several applications, it is desirable to have fundamental-transverse-mode output from fiber amplifiers. Techniques have been developed to operate LMA fiber amplifiers in the fundamental transverse mode despite the fact that the LMA fibers may support the propagation and amplification of higher-order modes. These techniques may breakdown when LMA fiber amplifiers are operated at high power. Specifically, the useful output power or energy from LMA fiber amplifiers can be limited by multimode instability (MMI), also referred to as transverse-mode instability (TMI) and sometimes just mode instability (MI), which couples power (energy) between the fundamental and higher-order transverse modes of the LMA fiber.

SUMMARY

Embodiments of the present invention include apparatus, systems, and methods of optical amplification. In one example, a system for optical amplification includes a gain fiber with a core surrounded by a cladding. The core contains a gain medium characterized by a gain spectrum. The system also includes a seed light source and a control light source. The seed light source, in optical communication with the core, transmits seed light, at a first wavelength in the gain spectrum, into the core of the gain fiber where it is amplified. The seed light has a first linewidth greater than 100 MHz. The control light source, in optical communication with the core, transmits control light, at a second wavelength shorter than the first wavelength, into the core where it interacts with the pumped gain medium so as to reduce the peak rate of heat deposition per unit length along the fiber and mitigate multimode instability of the amplified seed light. The control light has a second linewidth greater than 100 MHz. The system further includes a pump source, in optical communication with the gain fiber, to transmit pump light at a pump wavelength, shorter than the second wavelength, into the gain fiber so as to pump the gain medium and amplify the seed light.

In another example, a method of optical amplification includes propagating seed light at a first wavelength in a core of a gain fiber. The core of the gain fiber includes a gain medium to amplify the seed light. The seed light has a first linewidth greater than 100 MHz. The method also includes propagating control light at a second wavelength, shorter than the first wavelength, in the core of the gain fiber where it interacts with the pumped gain medium so as to reduce the peak rate of heat deposition per unit length along the fiber and mitigate multimode instability of the amplified seed light. The control light has a second linewidth greater than 100 MHz. The method further includes coupling pump light, at a third wavelength shorter than the second wavelength, into the gain fiber so as to pump the gain medium and amplify the seed light.

In yet another example, an optical amplifier includes a large-mode-area (LMA) gain fiber containing a Yb-doped gain medium, a seed light source, a control light source, and a pump light source. The seed light source, in optical communication with the LMA gain fiber, transmits seed light, at a first wavelength in the range from about 1040 nm to about 1080 nm, into a core of the LMA gain fiber where it is amplified. The seed light has a first linewidth greater than 100 MHz. The control light source, in optical communication with the LMA gain fiber, transmits control light, at a second wavelength in the range from about 1025 nm to about 1045 nm, into the core of the LMA gain fiber where it interacts with the pumped gain medium so as to reduce the peak rate of heat deposition per unit length along the fiber and mitigate multimode instability of the seed light. The control light has a second linewidth greater than 100 MHz. The pump source, in optical communication with the LMA gain fiber, transmits pump light, at a pump wavelength in the range from about 900 nm to about 985 nm, into the LMA gain fiber so as to pump the gain medium and amplify the seed light.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

Figure 1:
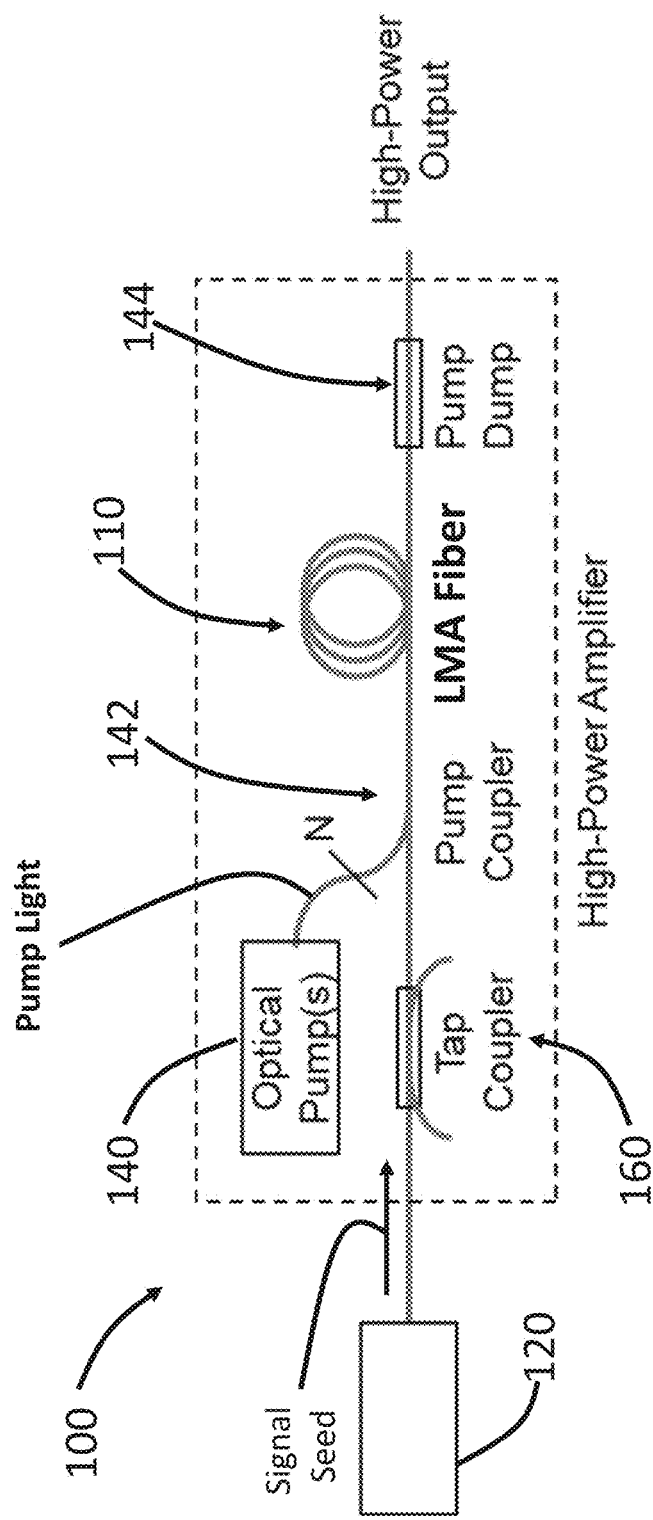
FIG. 1 shows a schematic of a conventional LMA fiber amplification system.

FIG. 1 shows a typical optical system 100 of a high-power Yb-doped large-mode-area (LMA) fiber amplifier. The system 100 includes a LMA gain fiber 110 within which a signal seed, provided by a signal seed source 120, is amplified. The LMA gain fiber 110 is pumped by a pump source 140 via a pump coupler 142. A pump dump 144 is disposed after the LMA gain fiber 110 to collect pump light that is not absorbed in the LMA fiber 110. A tap coupler 160 is disposed between the signal seed source 120 and the LMA gain fiber 110 to couple out a portion of the seed signal or feedback from the LMA gain fiber 110 for monitoring.

One issue with conventional LMA fiber amplifiers (e.g., the system 100 shown in FIG. 1) is that LMA fibers normally support not only the fundamental mode (i.e., $LP_{01}$ mode) of the light being amplified, but also higher-order modes. The presence of higher-order modes can induce multimode instability (MMI), which can limit the useful output power or energy from the fiber amplifier.

Without being bound by any particular theory or mode of operation, MMI in LMA fibers can be the result of positive feedback between a thermal grating and the beating of the fundamental and higher-order optical modes in a fiber. More specifically, the beating of the modes can generate the thermal grating, and the thermal grating in turn can couple power between the modes, thereby forming a positive feedback loop, i.e., instability. The heat that forms the thermal grating can be a result of quantum-defect heating and parasitic fiber absorption, and the grating length can be a fraction of the length of the gain fiber in the amplifier.

The onset of MMI in a fiber amplifier can degrade the mode quality and, in the case of polarization-controlled amplifiers, reduce the polarization extinction ratio (PER) as power in the fiber is transferred between the fundamental and higher-order transverse modes. Due to multimode instability, as well as stimulated Brillouin scattering, continuous wave (CW) fundamental-mode output power from Yb-doped fiber amplifiers can be limited at around 2.5 kW.

One way to mitigate multimode instability in fiber amplifiers is to reduce quantum-defect heating in the gain fiber. The quantum defect in an amplifier refers to the energy difference between the pump photons and the photons at the wavelength of the signal being amplified. For example, a Yb-doped fiber amplifier may be pumped by a diode laser at 977 nm (photon energy $2.03 \times 10^{-19}$ J) and amplify a signal at 1064 nm (photon energy $1.87 \times 10^{-19}$ J). When the signal is amplified, the difference in the photon energies, about $1.6 \times 10^{-20}$ J, is converted to heat in the fiber. Reduction of quantum-defect heating can be achieved by reducing the difference between the wavelength of the signal and the wavelength of the pump. While this method may increase the threshold for multimode instability, it can lead to compromises (e.g., in efficiency, stability, maximum power, compatibility with other components, etc.) in the performance of the system and may not be acceptable for a given application.

To address, at least partially, the limitation on output power imposed by multimode instability and the shortcomings that may be associated with conventional methods used to mitigate multimode instability, systems and methods described herein introduce control light co-propagating with the signal light in the gain fiber of the fiber amplifier. The wavelength of the control light ($\lambda_c$) is shorter than that of the signal light ($\lambda_s$), and is accordingly closer to the pump light ($\lambda_p$), i.e., $\lambda_p < \lambda_c < \lambda_s$. When the control light and signal light are propagating in the gain fiber of a fiber amplifier, the control light initially sees a larger optical gain than the signal light. Therefore, the control light is preferentially amplified at the beginning of the gain fiber. After a certain length in the gain fiber, the pump light is sufficiently depleted that the control light begins to see absorption. At that point, the amplified control light within the fiber core becomes a secondary pump for the gain medium (in addition to the pump light). In contrast, the signal light is now efficiently amplified. Both the primary pump and the control light can be almost completely absorbed before the end of the gain fiber, with the energy efficiently transferred to the signal.

Although the ultimate result is the transfer of energy from the pump light to the signal light, systems and methods described herein can break this transfer into two smaller steps, or a cascade transfer. Specifically, the pump energy is first transferred from the pump light to the control light, and then from the control light to the signal light. This cascade transfer can reduce the peak rate of heat deposition along the gain fiber, thereby increasing the threshold (with respect to pump power or amplifier output power) for detrimental thermal grating formation and accordingly the threshold for multimode instability.

Therefore, systems and methods described herein can raise the power threshold for multimode instability. Furthermore, these systems and methods can be applied in addition to any other method of mitigating multimode instability, thereby further increasing the useful output power from fiber amplifiers. As a secondary benefit, these systems and methods can also reduce nonlinear interactions, such as stimulated Brillouin scattering (SBS), which can limit the useful operating power of fiber amplifiers in the absence of MMI. Reduction of SBS can be achieved by delaying most of the amplification of the signal light until near the end of the gain fiber, where the control light is absorbed and becomes a secondary pump for the gain fiber, and thereby reducing the interaction length of the high-power signal light with the fiber, as will become more apparent in the discussion below.

Light Amplification Using a Control Light

Figure 2A:
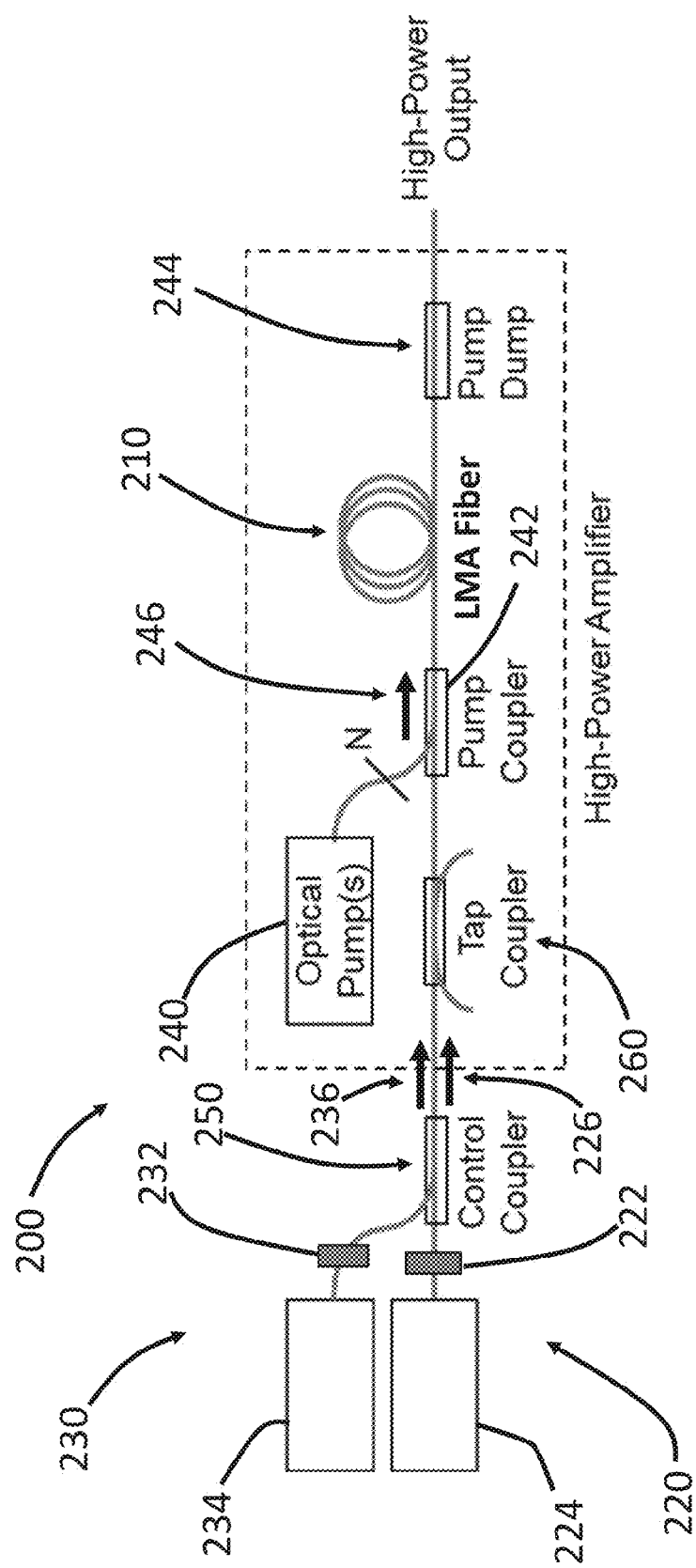
FIGS. 2A-2C show schematics of light amplification systems using control light.
Figure 2B:
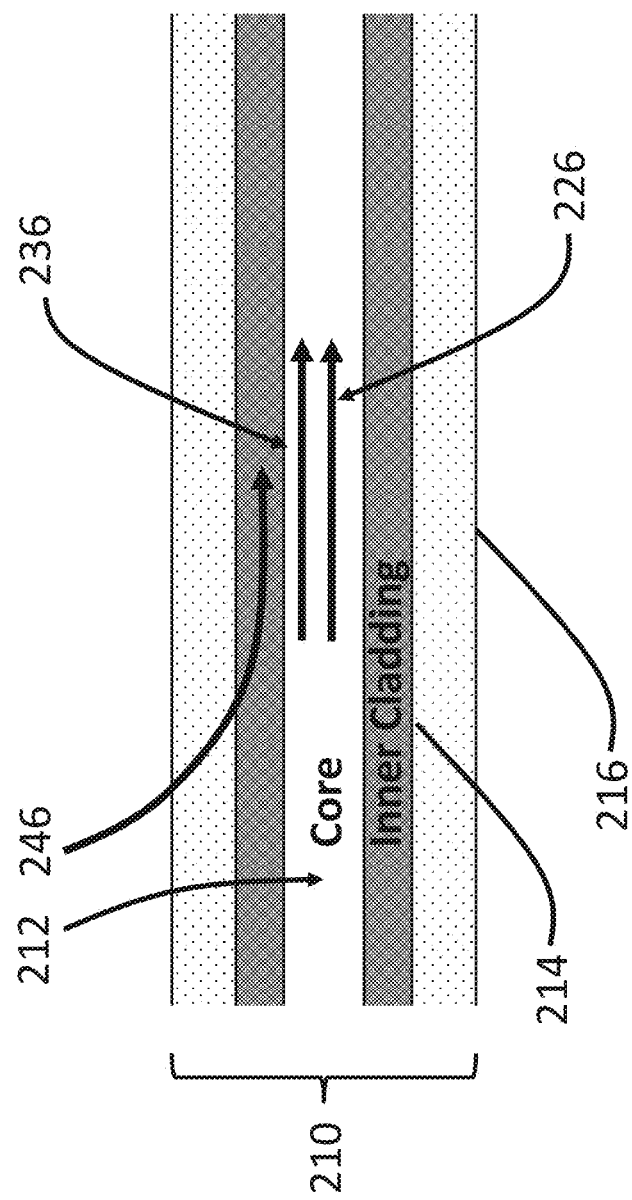

FIGS. 2A and 2B show schematics of an optical amplification system including control light to mitigate multimode instability. The system 200 includes a gain fiber 210, which receives seed light 226 transmitted by a seed light source 220 and control light 236 transmitted by a control light source 230. The gain fiber 210 includes a core 212 surrounded by an inner cladding 214 and an outer cladding 216 (i.e. it is a double-clad fiber as shown in FIG. 2B). In some examples, the gain fiber 210 can include only one cladding, or more than two claddings. The core 212 includes a gain medium characterized by a gain spectrum. A pump source 240 transmits pump light 246 to the gain fiber 210 to pump the gain medium in the gain fiber 210 so as to amplify the seed light 226 (and the control light 236 in part of the gain fiber 210).

The seed light 226 has a first wavelength in the gain spectrum and is coupled into the core 212 of the gain fiber 210 so as to be amplified in the gain fiber 210. In addition, the seed light 226 has a first linewidth greater than 100 MHz to reduce nonlinear interactions such as stimulated Brillouin scattering (SBS). The control light 236 has a second wavelength shorter than the first wavelength of the seed light 226 and sees a larger optical gain than the seed light 226 at the beginning of the gain fiber 210. The control light 236 is also coupled into the core 212 of the gain fiber 210 to effectively get amplified at the beginning of the gain fiber 210 and later on transfer energy back to the gain medium in the gain fiber 210 (i.e. it is absorbed by the gain medium). In addition, the control light 236 has a second linewidth greater than 100 MHz to reduce nonlinear interactions. Propagating the control light 236 simultaneously with the seed light 226 in the fiber 210 can reduce the peak rate of heat deposition per unit length along the gain fiber 210 due to the cascade energy transfer from the pump light to the control light and then from the control light to the seed light. The heat due to the quantum defect can be deposited more uniformly along the gain fiber 210, thereby mitigating the formation of a detrimental thermal grating in the gain fiber 210 and multimode instability that can be triggered by the thermal grating.

Various types of large-mode-area (LMA) fibers can be used as the gain fiber 210 in the system 200. In one example, the fiber 210 can be a multimode step-index fiber. In this case, the gain fiber 210 can have a combination of core dimension and refractive-index profile that can support multiple transverse optical modes propagating in the gain fiber 210. As is readily understood in the art, a fiber will support multiple transverse modes if its V number (sometimes referred to as the normalized frequency) satisfies the condition: $V=(\pi/\lambda)d_{core}(n^2_{core}-n^2_{clad})^{1/2}>2.405$, where $d_{core}$ is the diameter of the fiber core and $n_{core}$ and $n_{clad}$ are the refractive indices of the fiber core and inner cladding, respectively. In practice, the difference between the refractive index of the core and the refractive index of the cladding can be as low as around 0.001, limited by, for example, controllability of the fabrication process and susceptibility to environmental perturbations during operation of the fiber. A multimode step-index gain fiber operating at a wavelength of around 1 µm may have a core diameter of greater than or equal to 20 µm (e.g., 20 µm, 25 µm, 30 µm, 35 µm, or greater). A fiber operating at a wavelength of around 2 µm may have a core diameter of greater than or equal to 40 µm (e.g., 50 µm, 60 µm, 75 µm, or greater).

Alternatively, the gain fiber 210 could be a photonic crystal fiber (also referred to as a holey fiber or microstructured fiber), a chirally coupled core fiber, a leaky channel fiber, a trench fiber, or any other type of fiber designed to favor the propagation of a single transverse optical mode (e.g., by increasing the loss of higher-order modes while maintaining the guiding properties of the fundamental transverse mode). When used as the gain fiber in a high-power optical amplifier, these fibers may still be susceptible to multimode instability and the high-power operation of the amplifier could benefit from the systems and methods described herein.

Various types of gain media can be employed in the gain fiber 210 to amplify seed light 226 at different wavelengths. In one example, the gain fiber 210 can include Ytterbium ($Yb^{3+}$) ions doped in glass to form a fiber amplifier operating at wavelengths within the range from about 1.0 µm to about 1.1 µm. In another example, the fiber 210 can include Thulium ($Tm^{3+}$) ions to amplify light at wavelengths from about 1.7 µm to about 2.1 µm. In yet other examples, the fiber 210 can include Dysprosium ($Dy^{3+}$) ions to amplify light at wavelengths around 2.9 µm; Holmium ($Ho^{3+}$) ions to amplify light at wavelengths from about 1.95 µm to about 2.2 µm; Erbium ($Er^{3+}$) ions to amplify light at wavelengths within the range from about 1.50 µm to about 1.65 µm, or at wavelengths around 810 nm, 660 nm, 550 nm, 530 nm, or 490 nm; Neodymium ($Nd^{3+}$) ions to amplify light at wavelengths between about 0.9 µm and about 0.95 µm; or Praseodymium ($Pr^{3+}$) ions to amplify light at wavelengths around 490 nm or 610 nm. Those skilled in the art will recognize that there are numerous gain media that can be deployed in the gain fiber 210 for amplification of seed light 226 at a variety of wavelengths, and that high-power operation of amplifiers based on many of those gain media could benefit from the systems and methods described herein.

The seed light source 220 is configured to provide the seed light 226 for amplification in the gain fiber 210. In general, the wavelength of the seed light 226 is within the gain bandwidth of the gain medium in the gain fiber 210. In one example, the seed light source 220 includes a semiconductor diode laser 224. In another example, the seed light source 220 includes a fiber laser 224. This seed fiber laser may have the same gain medium as used in the gain fiber 210 or a different material. In yet another example, the seed light source 220 can include a solid-state laser 224, such as a non-planar ring oscillator (NPRO). As still another example, the seed light is initially generated by an amplified spontaneous emission (ASE) source 224 instead of a laser. The ASE source can be, for example, a semiconductor ASE source, a fiber-based ASE source, a solid-state ASE source, or any other type of ASE source known in the art, and may be filtered to limit its spectral profile.

The seed light source 220 can be configured to provide seed light 226 of various power (or energy) levels, and may include one or more optical amplifier. The optical amplifiers may be semiconductor optical amplifiers, solid-state amplifiers, or fiber amplifiers. Typically, the seed light source 220 will provide seed light at a power (energy) level greater than about 20-30 dB below the desired output power (energy) from the high-power amplifier system 200 (e.g., the seed power can be about 1 W to about 20 W in kilowatt fiber amplifiers).

The spectral linewidth of the seed light 226 provided by the seed light source 220 is in general broader than the gain bandwidth for stimulated Brillouin scattering (SBS) in the fiber amplifier. Those skilled in the art will readily understand that the linewidth required to avoid SBS in the fiber amplifier can increase with the desired output power from the amplifier. It will also depend on the length of fiber that the amplified seed light passes through, the wavelength of the seed light, the physical dimensions of the fiber, the chemical composition of the fiber, and other factors. The spectral linewidth of the seed light 226 provided by the seed light source 220 should be broad enough to avoid SBS in the amplifier system. For a system 200 employing a Yb:glass LMA gain fiber 210 operating with an output power of several kilowatts, the required seed spectral linewidth may be several tens of GHz. In other system, it may be as low as 100 MHz or less.

To increase the spectral linewidth of a laser 224 used in the seed light source 220 so that it is sufficiently broad to avoid SBS in the fiber amplifier, the output of the laser (or ASE source) 224 may be passed through a spectral broadening element 222. In one example, the spectral broadening element 222 is a phase modulator that imposes random (white) noise on the optical spectrum of the seed light 226. The phase modulator may be based on the electro-optic effect in materials such as, for example, lithium niobate ($LiNbO_3$) or lithium tantalate ($LiTaO_3$). In another example, the phase modulator is driven by a pseudo-random binary sequence or some other predetermined waveform and imposes a reproducible optical spectrum on the seed light 226. In yet another example, the spectral broadening element 222 is a nonlinear optical crystal and spectral broadening is achieved through nonlinear optical interactions. In still another example, the laser (or ASE source) 224 in the seed light source 220 has a sufficiently broad linewidth that no additional spectral broadening element 222 is required.

The control light source 230 in the system 200 is configured to provide control light 236, which can extract energy from the pumped gain medium in the beginning portion of the gain fiber 210 and then transfer it back to the gain medium in the end portion of the fiber 210, where it can be extracted by the seed light 226. In this process, the quantum-defect heating that occurs is distributed more uniformly along the length of the gain fiber 210 (compared to what would happen in the absence of control light), thereby reducing the peak rate of heat deposition along the gain fiber 210. In general, the wavelength of the control light 236 is shorter than the wavelength of the seed light 226, but longer than the wavelength of the pump light 246. For example, when the gain medium in the gain fiber 210 is Yb:glass pumped at a wavelength of around 977 nm, the control-light wavelength could be in the range from about 1030 nm to about 1040 nm (e.g., 1030 nm, 1034 nm, or 1040 nm) when the signal-light wavelength is in the range from about 1050 nm to 1070 nm (e.g., 1057 nm, 1064 nm, or 1070 nm).

Similar to the seed light 226, the control light 236 should have a sufficiently broad linewidth that it does not excite stimulated Brillouin scattering (SBS) or other detrimental nonlinear optical interactions. The above discussion of the seed source 220, the linewidth of the seed light 226, the initial generator of the seed light 224, and the seed spectral broadening element 222 applies to the control light source 230, the linewidth of the control light 236, the initial generator of the control light 234, and the control spectral broadening element 232. For many applications, however, the control light is not a useful output of the system 200 and application-based constraints on the spectral properties of the signal light 226 do not apply to the control light 236. As a result, there is typically no penalty for spectrally broadening the control light 236 well beyond what is required to avoid detrimental nonlinear optical interactions, and there is no advantage to using a predetermined or repeatable spectral profile on the control light 236. For many applications, the decision on how to implement the control light source 230 will be based on simplicity, reliability, and/or cost. Consequently, an ASE source may be attractive.

The performance of the system 200 is typically not very sensitive to the exact power (or energy) of the control light 236. Typical powers (energies) for the control light 236 may be in the range of 10% to 100% of the seed-light power (energy). With too little control light the benefits of the systems and methods described herein may not be fully realized. Too much control light may place undue stress on other components in the system 200. For example, if both the control light 236 and seed light 226 pass through a common optical isolator (not shown in FIG. 2), the combination of the control-light power (energy) plus the seed-light power (energy) may be limited. Less seed light means that the amplifier may need to operate at a higher gain in order to achieve the desired output power (energy). When an amplifier is operated at higher gain it becomes more susceptible to feedback and the damage that can result from feedback. In practice, the ratio of the control-light power (energy) to seed-light power (energy) can be adjusted during operation of the system 200 by, for example, monitoring and maximizing the output power (energy) of the system 200 (see more details below).

For some systems, it may be possible to generate the seed light 226 and the control light 236 from the same source. In one example, the broadband output of an ASE source is filtered to generate both the seed light 226 and control light 236. In another example, the control light source 230 can include ASE from an amplifier in the seed light source 220. In yet another example, the control light 236 is generated through nonlinear interactions when the seed light 226 is passed through a nonlinear crystal, or vice versa.

A control coupler 250 can be used to combine the control light 236 from the control light source 230 and the seed light 226 from the seed light source 220 into a common fiber which then couples both into the gain fiber 210. In one example, the control coupler 250 is a fiber wavelength division multiplexer that efficiently couples both the control light 236 and the signal light 226 into a common output fiber. In another example, the control coupler 250 is a fiber tap coupler that couples only a fraction of the control light 236 and a fraction of the signal light 226 into a common output fiber.

For some applications, the system 200 operates continuous wave (CW), and both the seed light 226 and the control light 236 are CW. For other applications, the output of the system 200, the seed light 226, and the control light 236 are pulsed. In this case, the seed light 226 and the control light 236 may be synchronized such that they can co-propagate in the gain fiber 210 at the same time. The synchronization between the seed light 226 and the control light 236 can be achieved, for example, through the use of optical delay lines or, in some cases, electronically. In some cases, the seed light 226 and control light 236 may be generated in such a way that synchronization is automatic. This may be the case when the seed light 226 and control light 236 are generated in a common source.

The pump source 240 as used in the system 200 is configured to provide the pump light 246 to pump the gain medium in the gain fiber 210. In general, the pump wavelength is shorter than both the seed wavelength and the control wavelength. In one example, when Yb:glass is used as the gain medium, the pump wavelength can be in the range from about 900 nm to about 985 nm.

The pump source 240 can include diode lasers and/or fiber lasers. Although FIG. 2 shows a single pump source 240, in practice, arrays of diode lasers and/or fiber laser(s) can be used to pump the gain fiber 210. For example, the pump source 240 can include multiple (N) high-power fiber-coupled diode lasers or diode-laser systems. A typical value for the number of fiber-coupled lasers N can be, for example, 6, 12, or 18. Alternatively, the pump source can be a high-power solid-state laser or a high-power beam-combined diode-laser system.

As shown in FIG. 2, a pump coupler 242 can be used to couple the pump light 246 from the pump source 240 into the fiber 210. In one example, the fiber 210 is a double-clad fiber (e.g., as shown in FIG. 2B), in which case the seed light 226 and the control light 236 propagate in the fiber core 212, while the pump coupler 242 couples the pump light 246 into the inner cladding 214 of the fiber 210. A pump dump 244 can be used to remove unabsorbed pump light from the output of the fiber 210. The pump coupler 242 may be implemented in fiber or may use bulk optics.

The system 200 can further include a tap coupler 260 to sample light propagating in the forward and/or backward direction in the fiber 210 for safety and diagnostic purposes. In one example, the tap coupler 260 is disposed between the seed/control light sources 220/230 and the fiber 210. In another example, the tap coupler 260 can be disposed between the pump source 240 and the fiber 210. Information obtained from monitoring the tap coupler can be used to control the pump light source 240, the seed light source 220, and/or the control light source 230 to optimize the performance of the system 200.

The system 200 may also include optical isolators (not shown in FIG. 2) to protect the seed light source 220 and the control light source 230 from, for example, optical damage induced by light reflected from other components in the system 200. In one example, the seed light 226 and control light 236 pass through the same optical isolator disposed between the control coupler 250 and the pump coupler 242. In another example, the seed light source 220 and control light source 230 each have their own isolator at their output (before the control coupler 250).

The system 200 may also include an end cap (not shown in FIG. 2) on the end of the fiber exiting the high-power amplifier. In one example, a glass end cap can allow the amplified light to expand before exiting into the ambient atmosphere and reduce the probability of damage at the glass-to-air interface. It can also reduce feedback into the amplifier from reflections at that interface. A passive fiber may be used between the gain fiber 210 and the end cap. In addition, the system 200 may include additional isolators and/or filters at the output to protect the high-power amplifier from feedback.

Figure 2C:
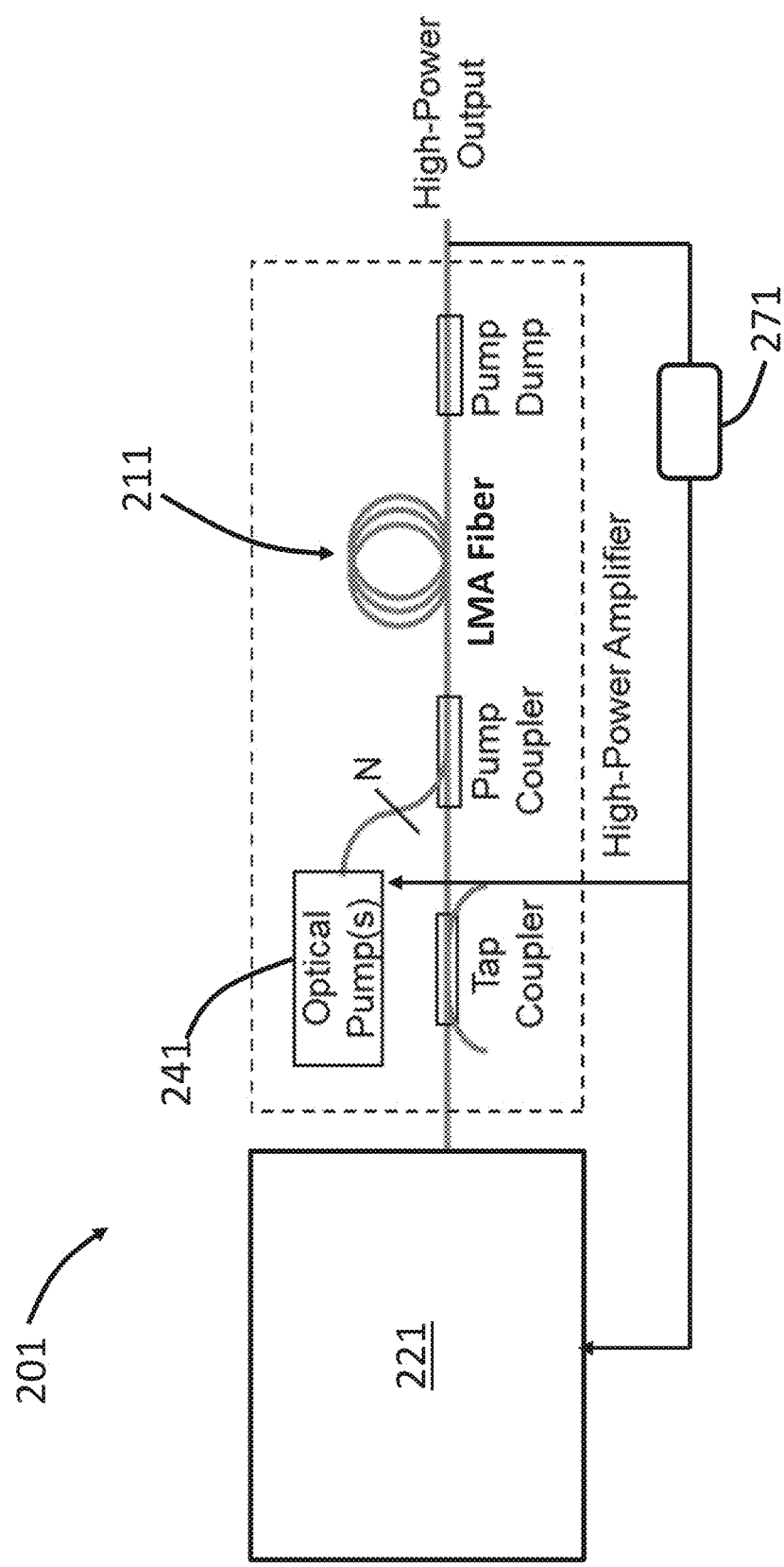

FIG. 2C shows a system 201 which includes output monitoring and feedback. In this system, both the seed light and the control light propagating in gain fiber 211, pumped by a pump source 241, are provided by a single light source 221. The light source 221 may include all of the components preceding the tap coupler 260 in FIG. 2A. In one example, a portion of the output light from the high-power amplifier is coupled into a detector 271 to monitor the output-light properties. The light source 221 and the pump source 241 are operably coupled to the detector 271. Based on the monitored properties, the properties of the seed light, the control light, and/or the pump light can be adjusted so as to improve the system performance.

In another example, a small portion of the output light from a non-polarization-maintaining high-power amplifier can be coupled out and further divided into a control arm and a sample arm. The control arm can be used in a feedback loop to optimize a selected fiber-amplifier output polarization state by controlling the polarization of the input signal seed. In the sample arm, the output beam can be transmitted through a pinhole and monitored for both spatial-mode properties and polarization extinction ratio (PER) variations that indicate the presence or absence of multimode instability. In addition, the information obtained from monitoring the spatial-mode properties and PER of the output beam can also be used for adjusting the parameters of the seed light, the control light, and/or the pump light, so as to maximize the useful output power from the system 201.

Amplification of both Seed Light and Control Light

Figure 3:
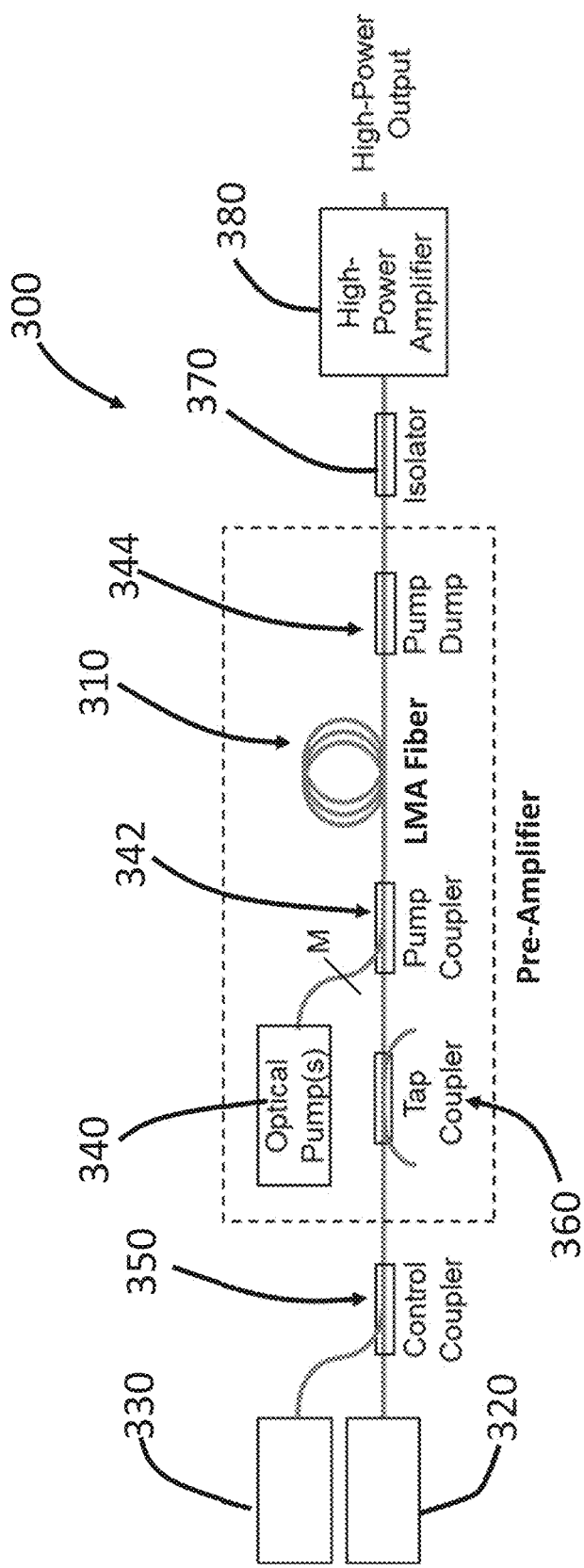
FIG. 3 shows a schematic of a light amplification system that amplifies two optical inputs.

FIG. 3 shows a schematic of an optical amplification system that can amplify both the seed light and the control light, and that may be useful as a pre-amplifier for a high-power amplifier employing the systems and methods discussed above. The system 300 includes a gain fiber 310 including a gain medium to receive seed light and control light via a control coupler 350. The seed light is provided by a seed light source 320 and the control light is provided by a control light source 330. A pump source 340 is employed to deliver pump light to pump the gain fiber 310, and a pump dump 344 is disposed at the output of the gain fiber 310 to receive unabsorbed pump light. In addition, a tap coupler 360 is disposed between the seed/control light source 320/330 and the gain fiber 310 to monitor properties of the seed light and/or the control light. The gain fiber 310, the seed light source 320, the control light source 330, the pump source 340, the control coupler 350, and the tap coupler 360 can be substantially similar to the corresponding elements used in the system 200 shown in FIG. 2 and therefore detailed descriptions of them are not repeated here.

The system 300 is configured to amplify both the seed light and the control light. To achieve this, in one example, the length of the gain fiber 310 is such that near the end of the gain fiber the control light has been significantly amplified and is beginning to be reabsorbed by the gain medium in the gain fiber 310. At this point, the seed light is experiencing significant amplification. In other words, the length of the fiber 310 is such that at its output end the control light is seeing loss and the seed light is seeing gain.

In general, a shorter length of gain fiber 310 can result in relatively greater amplification of the control light compared to the seed light. With the proper length of gain fiber and the proper amount of input pump light, input seed light, and input control light, the pre-amplifier can produce the desired amount of seed light and control light at its output. For example, the ratio of output control light to output seed light and the amount of power or energy in each can satisfy the input requirements for the high-power amplifier discussed above.

When used as a pre-amplifier, the amplified seed light and control light exiting gain fiber 310 pass through an isolator 370 before seeding a high-power amplifier 380. Information obtained from monitoring tap couplers in the high-power amplifier can be used to actively control the power (energy) level of the seed light, control light, and pump light delivered to the pre-amplifier in order to optimize the performance of the system.

Methods of Light Amplification Using Control Light

Figure 4:
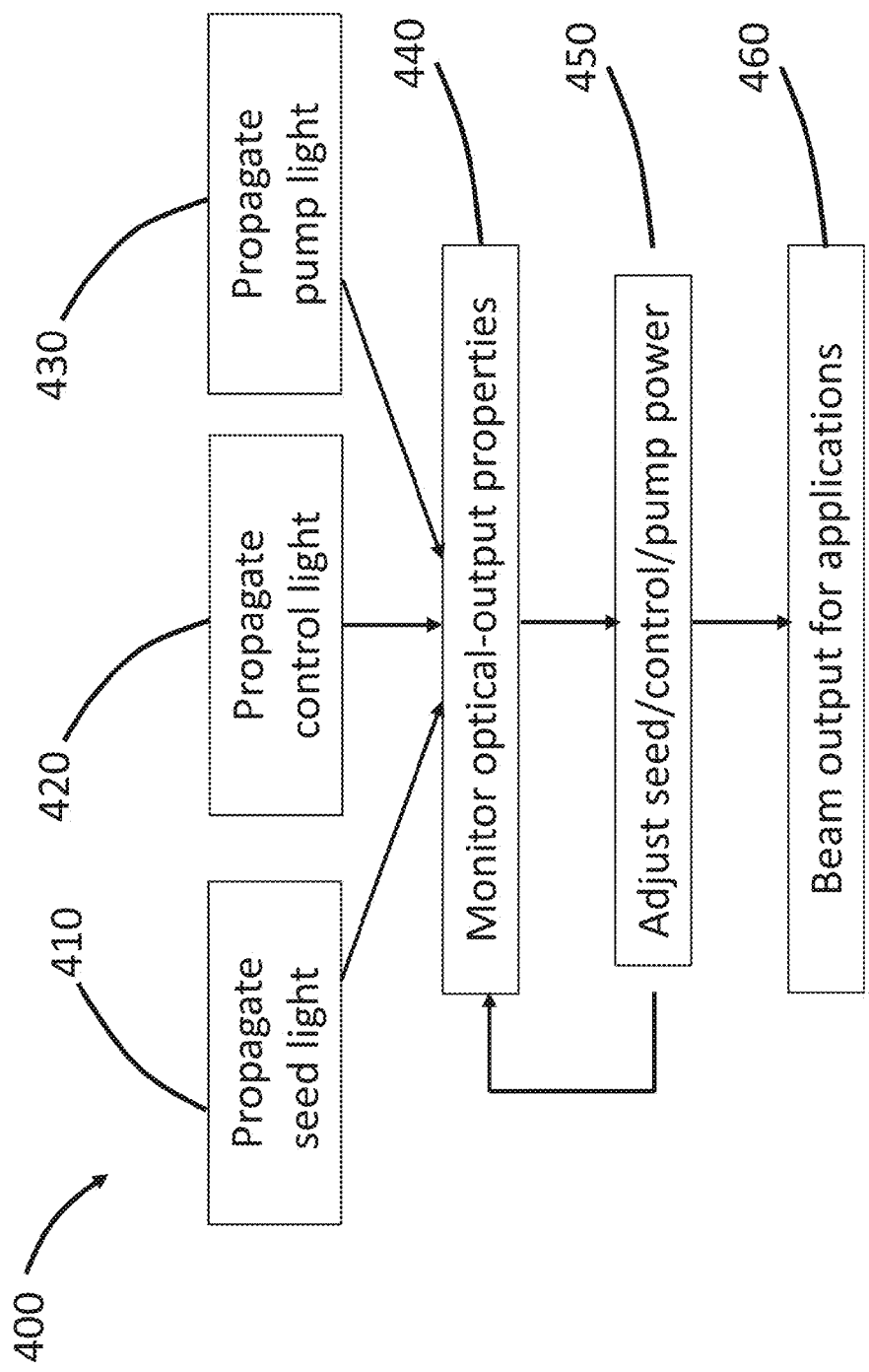
FIG. 4 illustrates methods of light amplification using control light.

FIG. 4 illustrates methods of light amplification using control light to mitigate multimode instability. At step 410, seed light at a seed wavelength is propagated in a core of a fiber. The core of the fiber includes a gain medium so as to amplify the seed light. The seed light has a seed linewidth greater than 100 MHz to reduce the effects of stimulated Brillouin scattering (SBS). At step 420, control light is also propagated in the core of the fiber. The control light has a control wavelength shorter than the seed wavelength and interacts with the gain medium so as to reduce the peak rate of heat deposition per unit length along the fiber. Similar to the seed light, the control light also has a control linewidth greater than 100 MHz. At step 430, pump light, at a pump wavelength shorter than both the seed wavelength and the control wavelength, is coupled into the fiber so as to pump the gain medium and amplify the seed light.

At step 440, the properties of the output light are monitored. The properties can include, for example, power, beam profile (also referred to as mode profile), and polarization, among others. The step 440 can also monitor the properties of the seed light, control light, and/or pump light.

Step 450 in the method 400 involves adjusting the power of inputs to the amplifier, including the seed light, control light, and/or pump light, depending on the properties monitored in step 440, to improve the performance of the system. For example, the power of the control light, seed light, and pump light can be adjusted to mitigate multimode instability and maximize the useful output power from the amplifier.

Step 440 and step 450 can form a feedback loop to achieve the desired amplifier output properties. In one example, during each cycle of the loop the method 400 can adjust the same one or more parameters (e.g., seed power, control power, and/or pump power). In another example, during different cycles of the feedback loop different parameters can be adjusted. For example, during one cycle of the feedback loop the seed-light power may be adjusted to achieve some local optimum. During a subsequent cycle the pump power can be adjusted to further improve the amplifier output properties.

Once the properties of the output are satisfactory, the output of the amplifier is transmitted for applications, such as welding, cutting, machining, marking and identification, sintering, brazing, and soldering, among others.

Rate Equations of Light Amplification Using Control Light

Without being bound by any particular theory or mode of operation, propagation of light in an optically pumped gain fiber can be described using rate equations. As an illustrative and non-limiting example, the propagation of light in a double-clad Yb:glass gain fiber is described herein. The gain fiber is characterized by the core diameter $d_{core}$, the inner-cladding diameter $d_{clad}$, and the core doping density N, assumed to be uniform within the core and zero elsewhere.

In this example, signal light (amplified seed light) has a wavelength $\lambda_s$ and is guided in the core of the gain fiber. Without loss of generality, the signal light can be modeled as uniformly distributed in a cross-sectional area $A_{signal}=(\pi/4)d_{core}^2$ with a photon flux $\Phi_s=P_s/h\nu_s A_{signal}$, where $P_s$ is the power at the signal wavelength, h is Planck's constant, and $\nu_s$ is the signal frequency. The pump light is guided by the inner cladding of the gain fiber and can be modeled as uniformly distributed in a cross-sectional area $A_{pump}=(\pi/4)d_{clad}^2$ with a total photon flux $\Phi_p=P_p/h\nu_p A_{pump}$.

Figure 5:
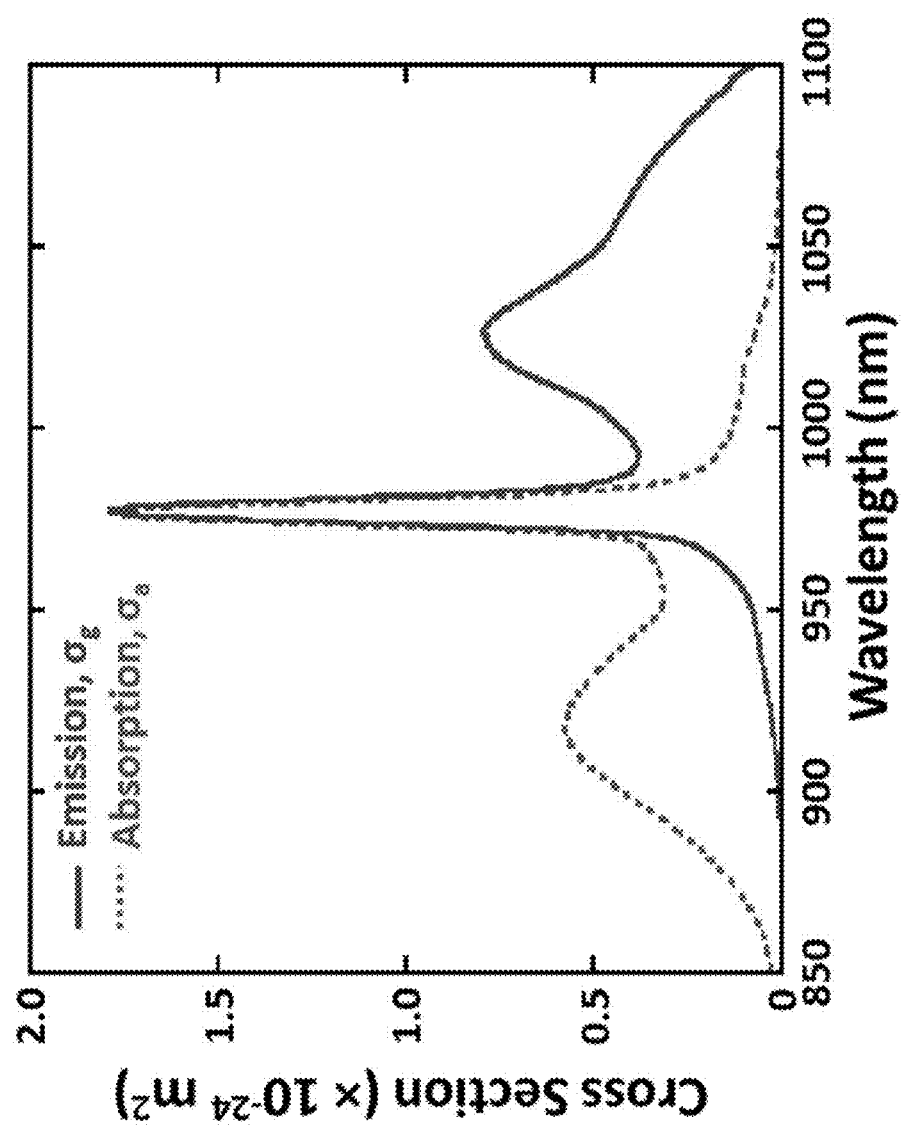
FIG. 5 shows absorption and emission cross sections of Yb:glass as a function of wavelength.

The Yb ions in the core of the gain fiber can occupy either the lower electronic manifold (also referred to as the lower manifold), with density $N_l$, or the upper electronic manifold (also referred to as the upper manifold), with density $N_u=N-N_l$. Yb ions in the lower manifold can absorb light with a wavelength-dependent effective cross section $\sigma_a(\lambda)$, corresponding to a transition rate from the lower to upper manifold of $\Phi(\lambda)N_l\sigma_a(\lambda)$. Yb ions in the upper manifold can undergo stimulated emission with an effective gain cross section $\sigma_g(\lambda)$, corresponding to a transition rate from the upper to lower manifold of $\Phi(\lambda)N_u\sigma_g(\lambda)$, or decay spontaneously to the lower manifold with a characteristic lifetime $\tau_{sp}$. FIG. 5 shows the cross sections $\sigma_a(\lambda)$ and $\sigma_g(\lambda)$ of Yb ions as a function of wavelength. The characteristic lifetime $\tau_{sp}$ is about 2 ms.

In this example, $d_{core}$=20 μm, $d_{clad}$=400 μm, the pump light has a pump wavelength of 977 nm, and the pump absorption is 1.5 dB per meter, corresponding to N=7.76×$10^{25}$ m$^{-3}$. In addition, the pump light and the signal light co-propagate in the gain fiber.

When light (signal light and/or pump light) propagates in the gain fiber, the upper Yb manifold population changes as a result of optical absorption, stimulated emission, and spontaneous emission. In general, the optical field in the fiber can be modeled as a set of fluxes, each at a discrete wavelength. The rate equation for the upper manifold then becomes:

$$\dot{N}_u = N_l \Sigma_\lambda \Phi(\lambda)\sigma_a(\lambda) - N_u \Sigma_\lambda \Phi(\lambda)\sigma_g(\lambda) - N_u/\tau_{sp} \quad (1)$$

where the dot over $N_u$ denotes the time derivative. $N_u$, $N_l$, and $\Phi(\lambda)$ are implicit functions of the position z in the fiber, i.e. $N_u=N_u(z)$, $N_l=N_l(z)$, and $\Phi(\lambda)=\Phi(\lambda, z)$. In steady state, $\dot{N}_u=0$ and the population density in the upper manifold is $$N_u = \frac{\sum_\lambda \Phi(\lambda)\sigma_a(\lambda)}{\sum_\lambda \Phi(\lambda)[\sigma_a(\lambda) + \sigma_g(\lambda)] + 1/\tau_{sp}} N \quad (2)$$

If the only light present in the fiber is the pump light, $N_u=0.5N/[1+1/(0.28 \cdot P_p)]$, with $P_p$ in Watts. Pump saturation occurs at very modest pump powers ($P_p \sim 1/0.28$ W) and the population density of the upper manifold approaches half of the total Yb-ion density ($N_u=N/2$) at the pump powers used in high-power fiber amplifiers.

The signal light propagating in the gain fiber can be amplified through stimulated emission or absorbed depending on the population of the upper manifold. Transparency occurs when stimulated emission and absorption cancel each other, i.e. $N_l\sigma_a(\lambda_s)=N_u\sigma^g(\lambda_s)$, $$N_{u,tr}(\lambda_s) = \frac{N}{1 + \sigma_g(\lambda_s)/\sigma_a(\lambda_s)} \qquad (3)$$

$$\Phi_{p,tr}(\lambda_s) = \frac{\sigma_a(\lambda_s)}{\{\sigma_a(\lambda_p)[\sigma_a(\lambda_s) + \sigma_g(\lambda_s)] - \sigma_a(\lambda_s)[\sigma_a(\lambda_p) + \sigma_g(\lambda_p)]\}\tau_{sp}} \qquad (4)$$

where the subscript tr in Equations (3) and (4) denotes transparency.

Figure 6A:
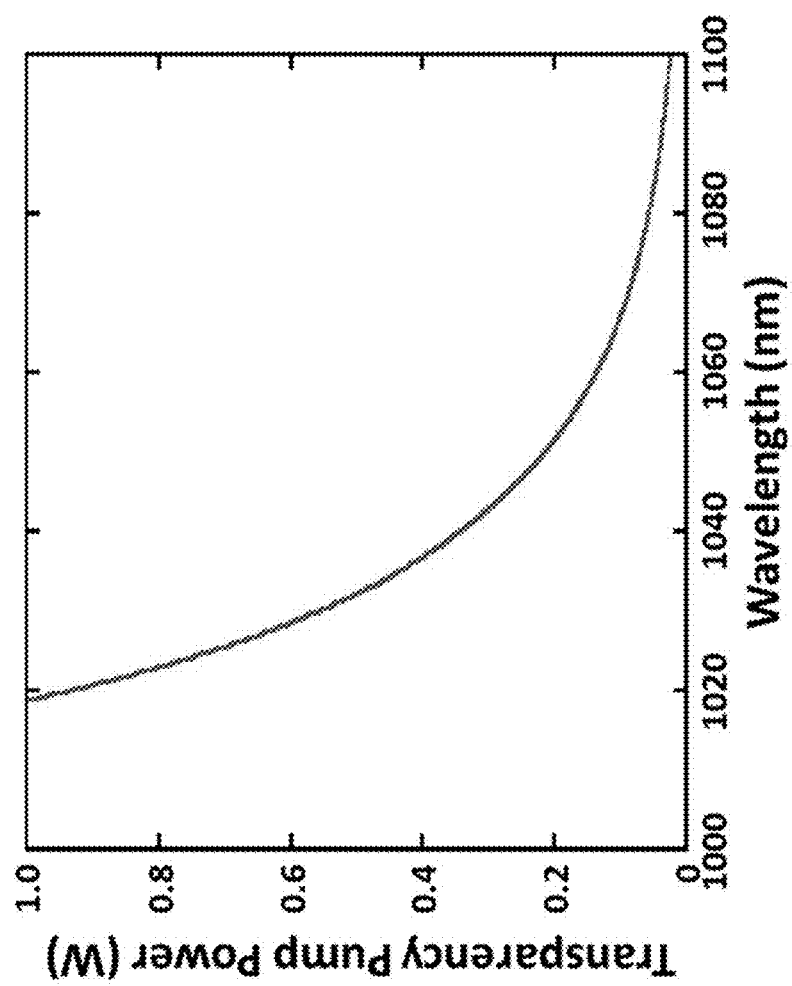
FIG. 6A shows the transparency pump power for Yb:glass fiber as a function of wavelength when pumped by light at 977 nm.

FIG. 6A shows the transparency pump power for the gain fiber in this example as a function of signal wavelength when only the pump light is present in the fiber. Over the signal wavelength range of interest, from about 1030 nm to about 1080 nm, the transparency pump power can be modest and decreases monotonically with wavelength, i.e. light at longer wavelengths has a lower transparency pump power.

Figure 6B:
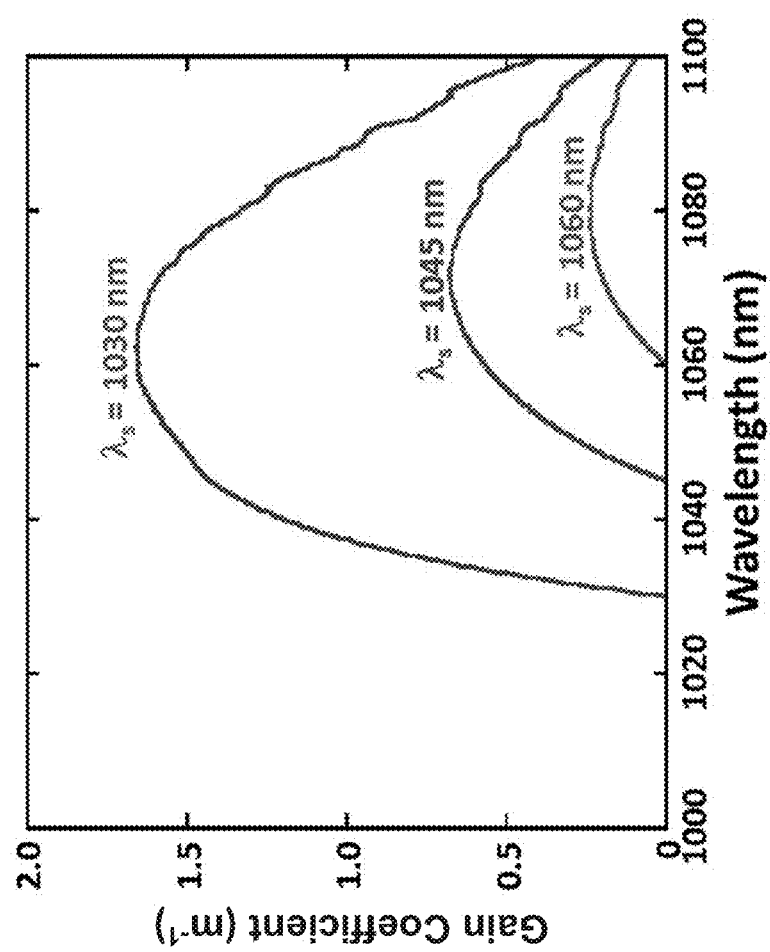
FIG. 6B shows the gain coefficient for Yb:glass fiber as a function of wavelength when the fiber is pumped at the transparency pump power for signal wavelengths of 1030 nm, 1045 nm, and 1060 nm.

FIG. 6B shows the gain coefficient for the gain fiber when the fiber is pumped at the transparency pump power for signal light at wavelengths of 1030 nm, 1045 nm, and 1080 nm. As can be seen from FIG. 6B, when the fiber is pumped at the transparency pump power for a signal at a signal wavelength $\lambda_s$, light at wavelengths shorter than the signal wavelength ($\lambda<\lambda_s$) is absorbed, while light at longer wavelengths ($\lambda>\lambda_s$) sees a net gain and can be amplified.

For fibers similar to the one discussed in this example, multimode instability typically occurs when the pump power and amplified signal power are in the kilowatt range. If the only interactions affecting the population of the upper manifold are interactions between the gain medium and the pump light, then at these pump powers nearly half of the Yb-ion population is in the upper manifold and the gain coefficient for signal wavelengths of interest (from about 1030 nm to about 1080 nm) is in the range of several tens per meter, corresponding to a gain in excess of several tens of thousands per meter.

Figure 7:
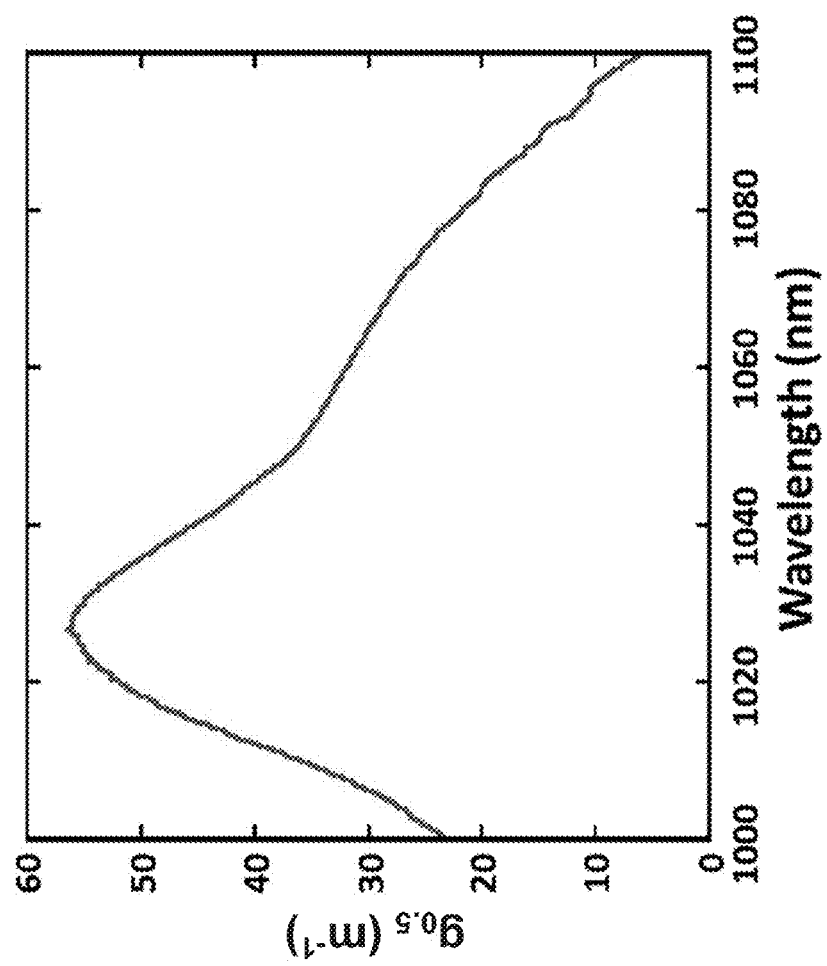
FIG. 7 shows the gain coefficient for Yb:glass fiber when half of the Yb-ion population is in the upper electronic manifold.

FIG. 7 shows the gain coefficient $g_{0.5}(\lambda)$ of light as a function of wavelength when half of the Yb-ion population is in the upper electronic manifold. For signal wavelengths in the range between 1030 nm and 1080 nm, the gain is larger at shorter wavelengths.

With this amount of gain, the input signal light (seed light) is quickly amplified up to a power level that saturates the gain of the gain fiber and drives the upper-manifold population down toward the transparency level, similar to the way that lasing clamps the gain of a laser at its threshold value. The upper manifold population, when we consider pumping at wavelength $\lambda_p$ and amplification at wavelength $\lambda_s$, becomes:

$$N_u = \frac{\Phi_p \sigma_a(\lambda_p) + \Phi_s \sigma_a(\lambda_s)}{\Phi_p[\sigma_a(\lambda_p) + \sigma_g(\lambda_p)] + \Phi_s[\sigma_a(\lambda_s) + \sigma_g(\lambda_s)] + 1/\tau_{sp}} N \qquad (5)$$

At the power levels where multimode instability can raise concerns, the term in Equation (5) containing the spontaneous lifetime ($\tau_{sp}$) is insignificant and can be safely ignored. In addition, the signal light is confined within the core of the gain fiber and the pump light is guided in the inner cladding, which has a much larger cross section than the core. Therefore, the terms containing the signal flux $\Phi_s$ dominate at high signal powers and Equation (3) becomes a reasonable approximation for Equation (5). As the signal light is amplified the density of Yb ions in the upper manifold is pulled down toward the transparency level. This happens more quickly at shorter wavelengths where the absorption cross sections are large, but happens for all wavelengths after a reasonable amount of amplification.

Figure 8:
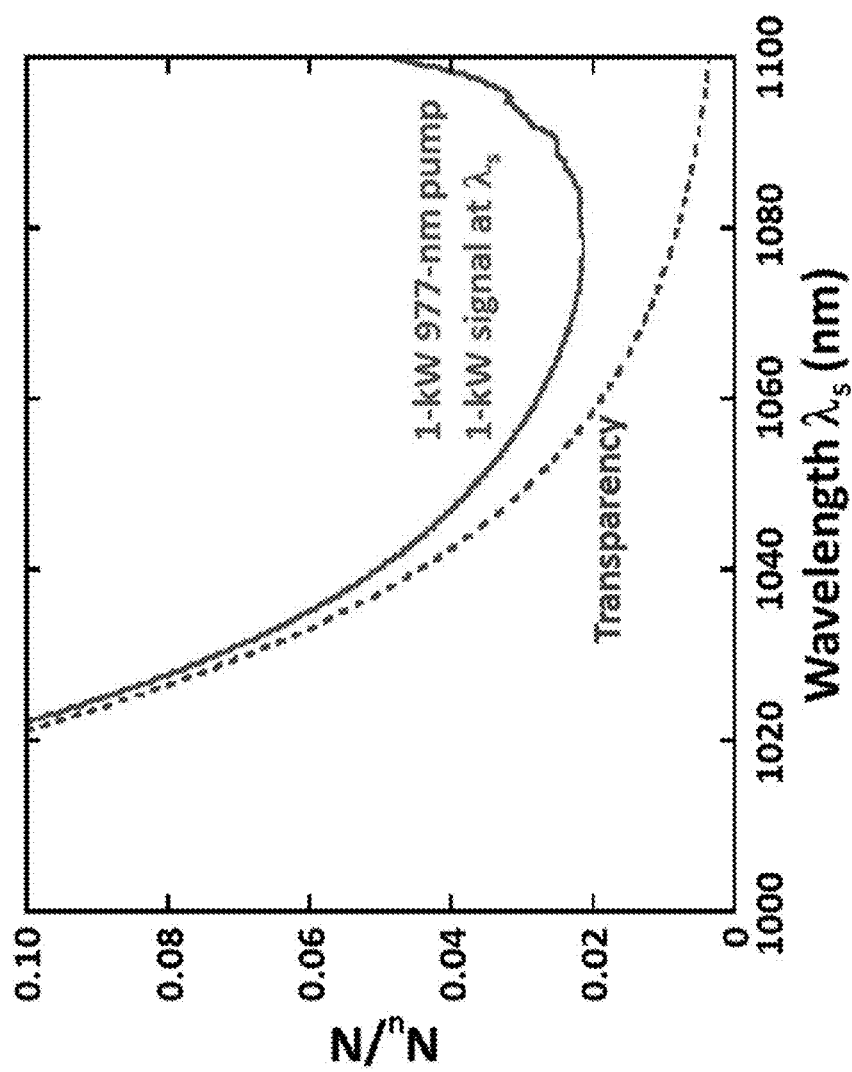
FIG. 8 (solid curve) shows the calculated density of Yb ions in the upper manifold when a section of Yb:glass fiber is pumped with 1 kW of 977-nm light as a function of signal wavelength, when there is 1 kW of signal light in the fiber. For comparison, the dotted curve shows the upper-manifold population density at transparency.

FIG. 8 (solid curve) shows the calculated density of Yb ions in the upper manifold when a section of Yb:glass fiber is pumped with 1 kW of 977-nm light as a function of signal wavelength, when there is 1 kW of signal light in the fiber. For comparison, the dotted curve shows the upper-manifold population density at transparency.

Figure 9:
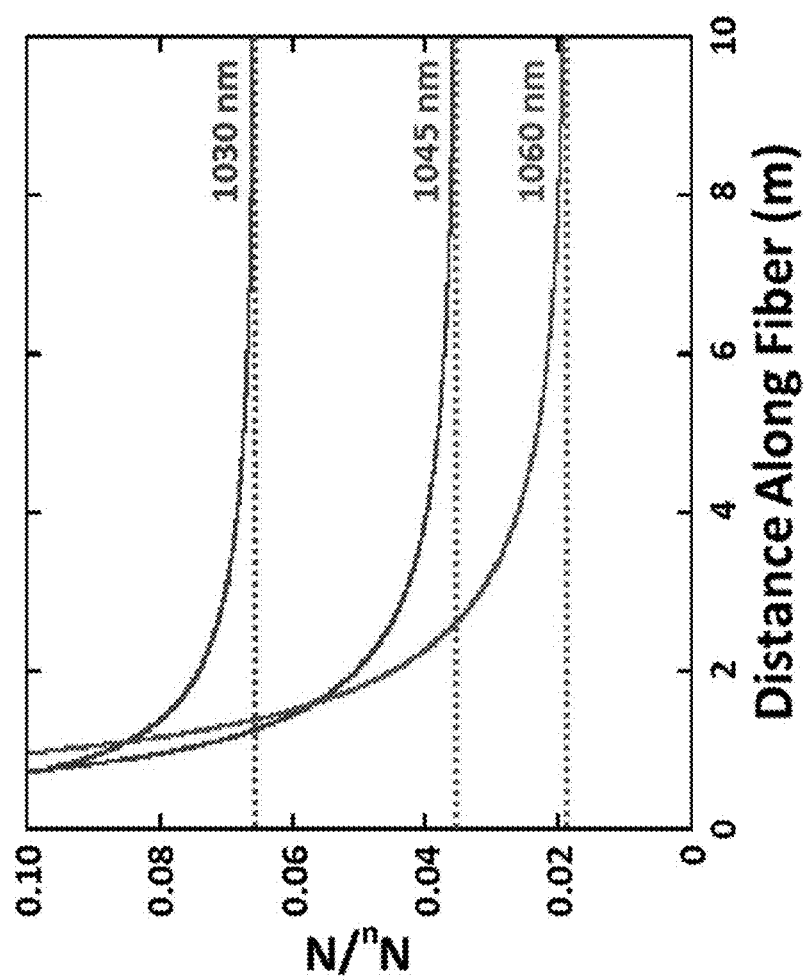
FIG. 9 shows the calculated upper-manifold population density as a function of position in 10-m-long fiber amplifiers. From top to bottom, the solid curves shows the upper-manifold population density of a fiber amplifier operating at a signal wavelength of 1030 nm, a signal wavelength of 1045 nm, and a signal wavelength of 1060 nm. All three fiber amplifiers are pumped at 3.5 kW and seeded with 10 W of signal power. For comparison, the dotted lines show the upper-manifold population density at transparency.

FIG. 9 shows the calculated upper-manifold population density as a function of position in 10-m-long fiber amplifiers. From top to bottom, the solid curves shows the upper-manifold population density of a fiber amplifier operating at a signal wavelength of 1030 nm, a signal wavelength of 1045 nm, and a signal wavelength of 1060 nm. All three fiber amplifiers are pumped at 3.5 kW and seeded with 10 W of signal power. For comparison, the dotted lines show the upper-manifold population density at transparency.

As the signal light propagates through the fiber and depletes the upper-manifold population, the gain in the fiber can be greatly reduced and the peak of the gain shifts to longer wavelengths, as can be seen by comparing FIG. 6B and FIG. 7. As long as the population of the upper manifold stays above the transparency threshold for the signal wavelength, the net effect is to transfer power from the pump light to the signal light. In conventional fiber amplifiers, where the only inputs to the gain fiber are the pump light and signal light, the amplification can be efficient, limited mainly by pump absorption and the quantum defect.

The above rate-equation analysis does not take into account coupling between the fundamental and higher-order transverse modes or nonlinear interactions. These effects can limit the amount of useful power that can be obtained from a single-mode fiber amplifier. As described in previous paragraphs, multimode instability (MMI) is related to the heat load in the gain fiber over a length necessary to form an effective thermal grating. This length can be much shorter than the length of the gain fiber in a fiber amplifier. As a result, in some cases it can be the peak heat load in the gain fiber that is responsible for multimode instability. Decreasing the peak heat load may increase the threshold for MMI.

The strength of nonlinear interactions in a fiber depends on the intensity of the light in the fiber and the fiber length. Decreasing the amount of fiber that sees high-intensity light can increase the intensity of the light that can be generated in a gain fiber before the onset of detrimental nonlinear interactions. Dual-wavelength seeding (i.e. using signal light and control light) can help mitigate both MMI and nonlinear interactions. This can be understood within the framework of the rate-equation treatment given above.

Numerical Simulations of Light Amplification Using Control Light

As an illustrative and non-limiting example, numerical simulations here consider a 10-m-long fiber amplifier pumped with 3.5 kW of 977-nm light and seeded with 10 W of signal light at 1064 nm and control light at 1035 nm. The fiber properties are the same as those considered in the above rate-equation analysis. The amplitudes of the pump, signal, and control light can be calculated as a function of position in the fiber using $$d\Phi(\lambda)/dz = [N_u \sigma_g(\lambda) - N_f \sigma_a(\lambda)]\Phi(\lambda) \qquad (6)$$

The code used to implement Equation (6) is RP Fiber Power by RP Photonics, which also accounts for the transverse profile of the modes in the gain fiber and includes amplified spontaneous emission (ASE). These details make the results more accurate, but do not deviate from the physics discussed earlier. The rate of heat deposition along the fiber can be calculated using $$Q(z) = \frac{d}{dz} \sum_{\lambda} P(\lambda) \quad (7)$$

where $|P(\lambda)|$ is the optical power at wavelength $\lambda$ and $P(\lambda)$ is positive for light traveling toward the output end of the fiber and negative for light traveling in the opposite direction.

Figure 10:
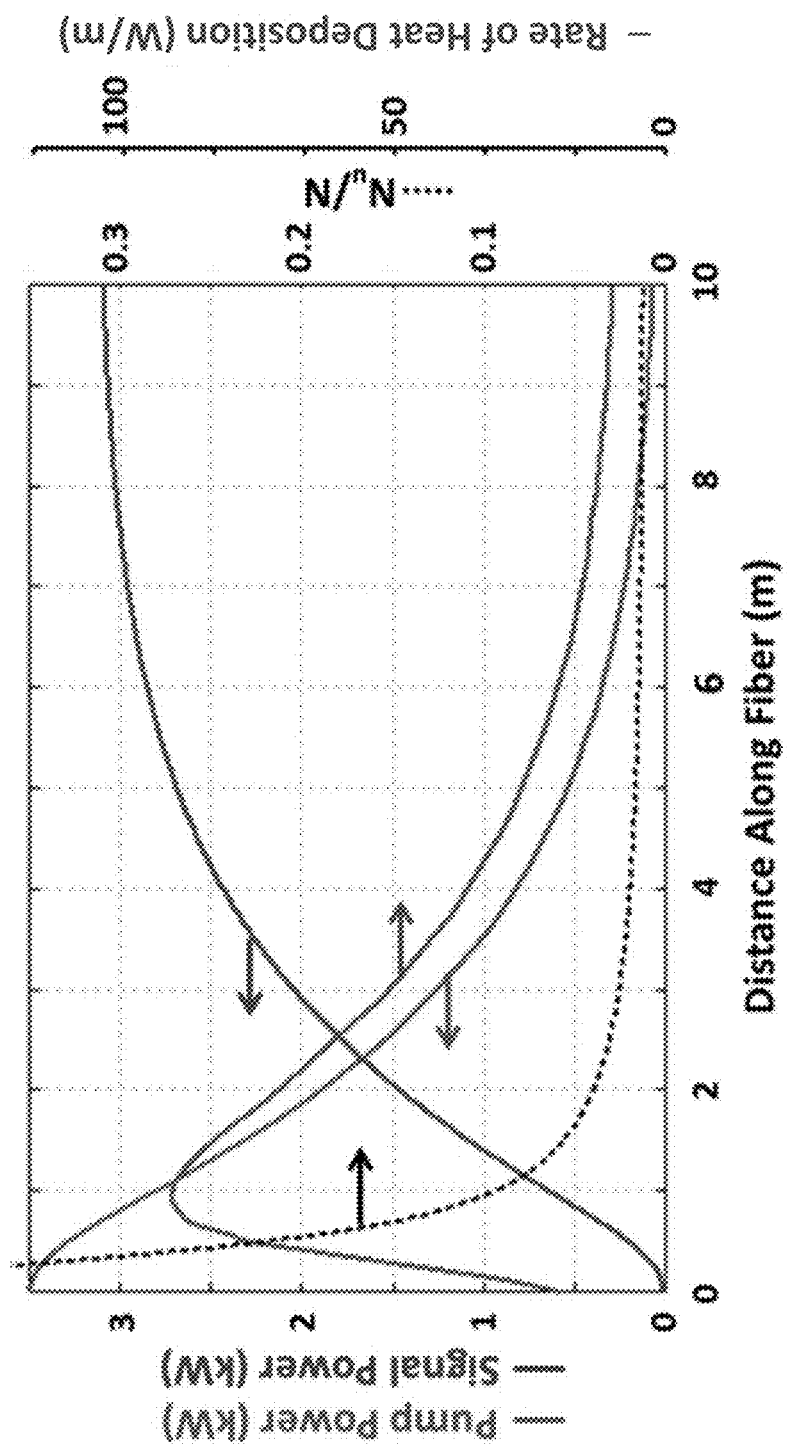
FIG. 10 shows simulated results for the pump power (977 nm), signal power (1064 nm), fractional upper-manifold population $N_u/N$, and rate of heat deposition as a function of fiber position in a 10-m-long Yb:glass fiber pumped at 3.5 kW and seeded with 10 W at 1064 nm.

FIG. 10 shows the pump power, signal power, fractional upper-manifold population density $N_u/N$, and rate of heat deposition as a function of fiber position when there is no injected control light. At the input end of the fiber the upper-manifold population is nearly half of the total Yb-ion population and the gain is enormous. As the signal light propagates along the fiber the power of the signal light increases quickly, driving the upper-manifold population toward its transparency level and reducing the gain. Since the thermal deposition is due to the quantum defect, it is greatest where the rate of stimulated emission, proportional to the product of the power in the amplified signal light and the upper-manifold population, is the largest. In FIG. 10 this occurs about 1 m into the 10-m-long fiber. The fiber is long enough to absorb most of the pump light, but short enough that the pump light never falls below the transparency level for the signal light, and efficient amplification is obtained.

Figure 11:
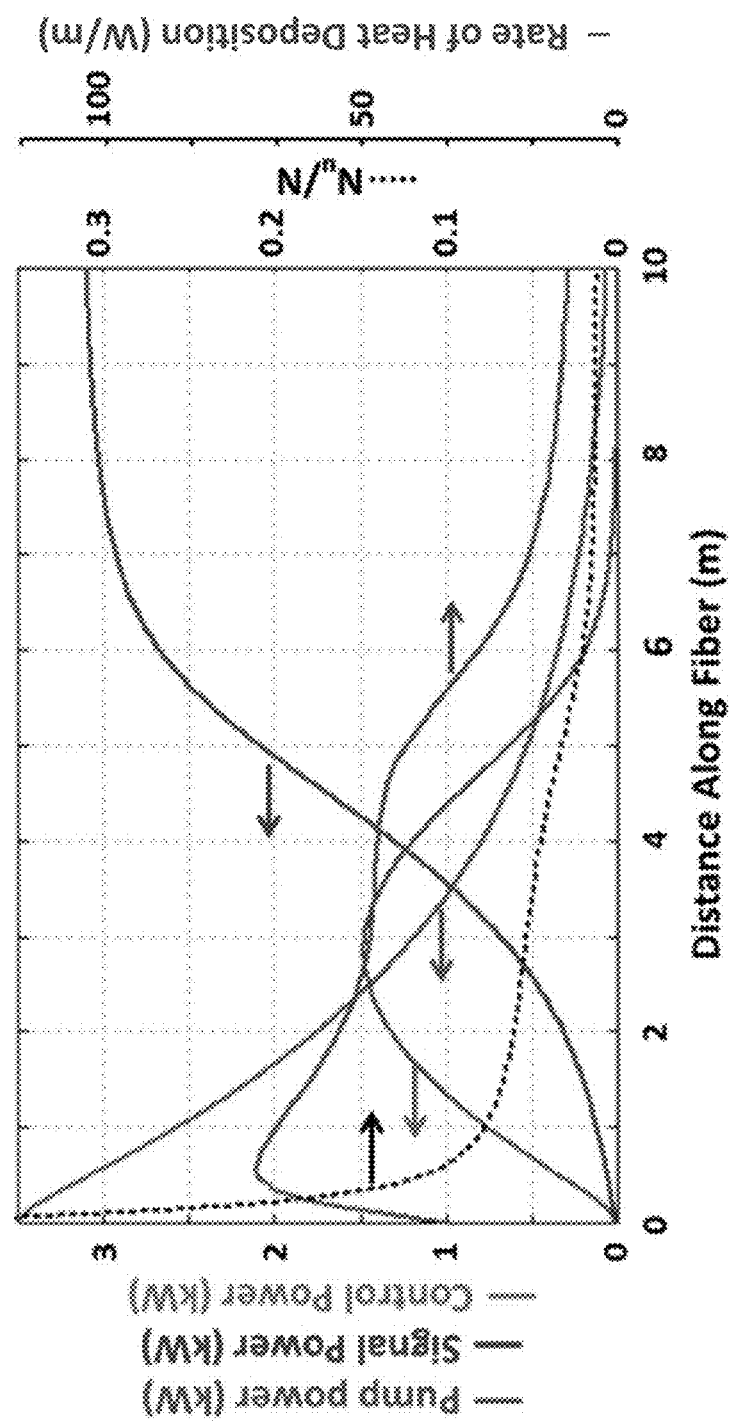
FIG. 11 shows simulated results of pump power (977 nm), signal power (1064 nm), control power (1035 nm), fractional upper-manifold population $N_u/N$, and rate of heat deposition as a function of fiber position in a 10-m-long Yb:glass fiber pumped at 3.5 kW and seeded with 10 W of signal power and 10 W of control power.

In contrast, FIG. 11 shows the pump power, signal power, control power, fractional upper-manifold population density $N_u/N$, and rate of heat deposition as a function of fiber position when a 10-W, 1035-nm control light is added to the inputs of the 1064-nm amplifier. Near the input end of the fiber the gain is much higher at the shorter wavelength of the control light than at the signal wavelength. The control light builds up quickly and drives the upper-manifold population toward its transparency level. This reduces the gain at both the control and signal wavelengths, but much more so at the control wavelength. Light at the signal wavelength continues to see exponential growth and pulls the upper-manifold population below transparency for the control light, toward its own transparency level. At that point in the fiber, the control light becomes a second pump for the signal light. Since the control light is confined to the fiber core (unlike the pump light which is distributed throughout the inner cladding) it is very efficient at transferring its energy to the signal light. The control light is quickly absorbed and the signal light sees rapid amplification. The fiber is long enough to absorb nearly all of the control light and most of the pump light, and short enough that the pump light never falls below the signal-light transparency level. Again, efficient amplification is obtained.

It is informative to compare the thermal-deposition profiles for the single- and dual-wavelength simulations shown in FIG. 10 and FIG. 11, respectively. The maximum thermal deposition occurs earlier in the dual-wavelength-seeded amplifier since, near the input end of the gain fiber, there is higher gain at the shorter wavelength of the control light than at the signal wavelength. However, the peak rate of heat deposition is lower because the quantum defect is smaller for the control light. There is a second heat deposition when the control light becomes a pump source for the signal light. This occurs later in the fiber. The net result is that the thermal deposition is spread out over a much greater length of the fiber in the dual-wavelength-seeded amplifier and the peak rate of heat deposition is significantly reduced.

Furthermore, the first heat deposition, near the beginning of the fiber, is at a position where there is very little signal light. At this point in the fiber, to first order, beating between the fundamental and higher-order transverse modes is at a frequency corresponding to the control light. The resulting thermal grating is not phase matched to the signal light and will not contribute significantly to its scattering. As a result of both of these effects, the decrease in the peak rate of heat deposition and the formation of thermal gratings at different wavelengths, the MMI threshold can occur at significantly higher operating powers in an amplifier with dual-wavelength seeding compared to conventional single-wavelength fiber amplifiers.

Comparing the signal power curves in FIG. 10 and FIG. 11, the average power of the signal light over the total length of fiber in the amplifier with the control-light input is lower than the average power of the signal light in the amplifier without the control light. The peak signal power in the amplifier with the control light never exceeds that of the amplifier without the control light. For a given output power, nonlinear interactions in an amplifier with a control-light input will be weaker, allowing the amplifier to operate at higher output powers.

Experimental Results of Light Amplification Using Control Light

Figure 12A:
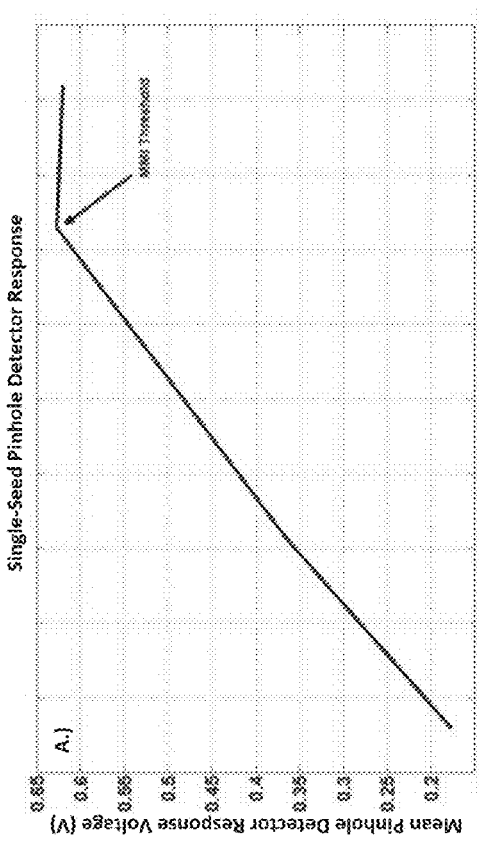
FIGS. 12A and 12B show experimental results for the mean pinhole photodetector signal as a function of fiber-amplifier output power with (FIG. 12A) and without (FIG. 12B) control light.
Figure 12B:
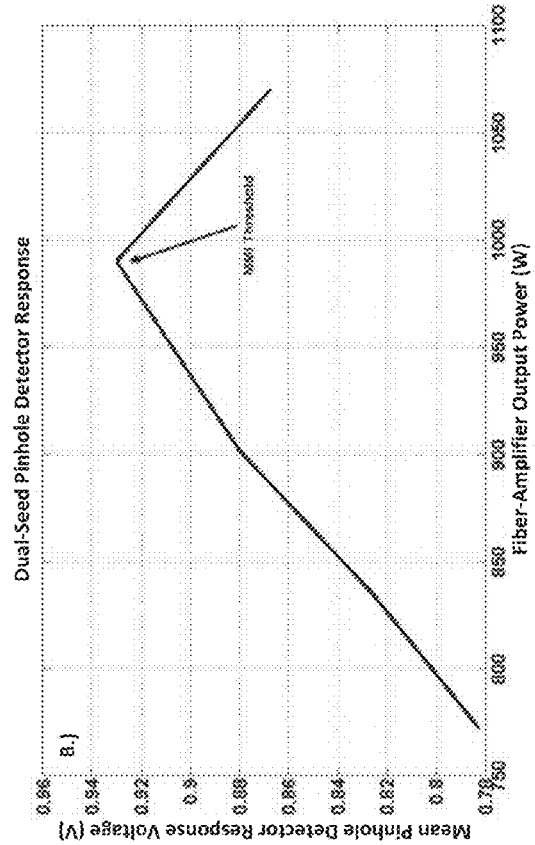
Figure 13:
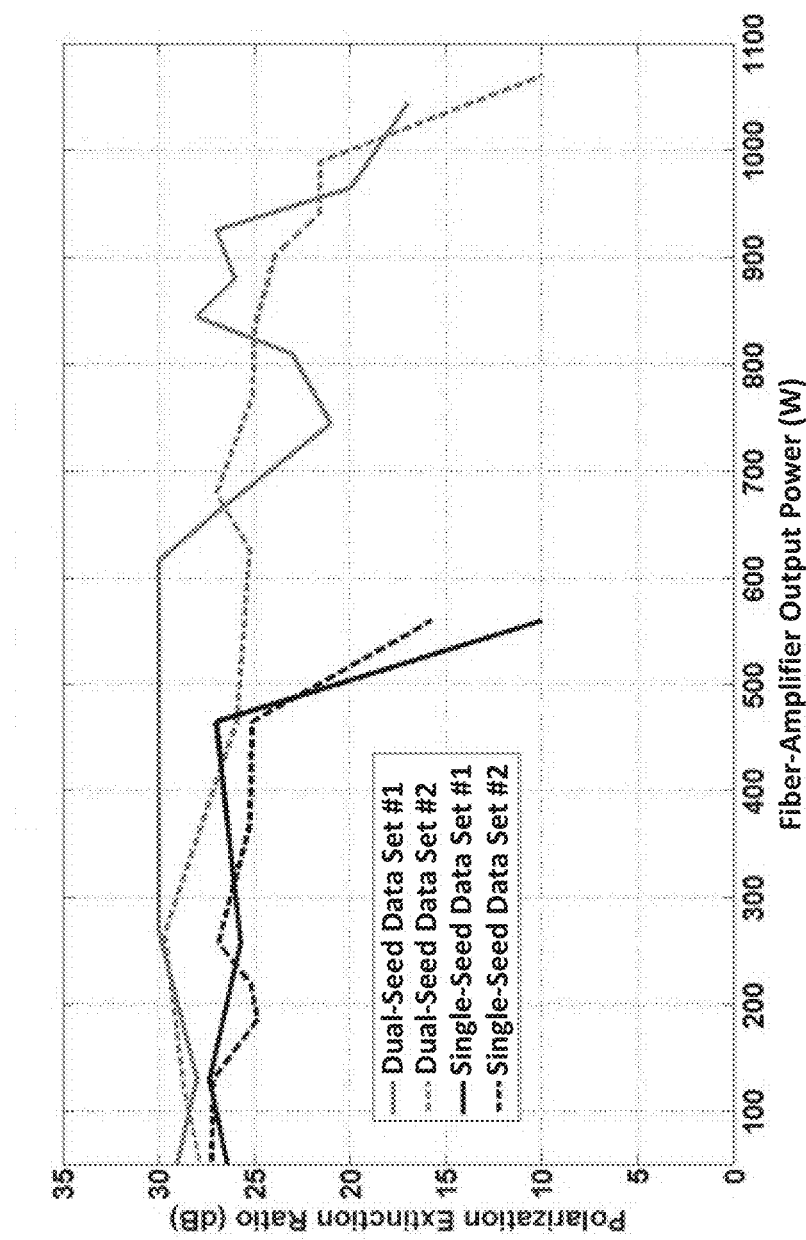
FIG. 13 shows experimental results for the polarization extinction ratio (PER) as a function of fiber-amplifier output power with and without control light.

FIGS. 12A, 12B, and 13 show experimental results obtained from high-power optical amplifiers with and without the use of control light. The experimental parameters are as follows: the pump light is at 977 nm, the signal light (seed light) is at 1064 nm, and the control light is at 1033 nm. Both the signal light and the control light are spectrally broadened to over 30 GHz to avoid stimulated Brillouin scattering (SBS). The signal and control light are combined and amplified in a common pre-amplifier before seeding the high-power amplifier. For the single-wavelength-seeded experiments, the signal light (seed light) at the input of the high-power amplifier has a power of 7.0 W. For the dual-wavelength-seeded experiments the input signal light (seed light) and input control light have powers of 2.0 W and 6.8 W, respectively.

The high-power amplifier is constructed with an Yb-doped double-clad LMA fiber. The output of the high-power amplifier is filtered to remove residual pump light and sent to a power meter. A small portion of the output is picked off and split between two arms of the MMI detection setup, a control arm and a sample arm. The control arm is used in a feedback loop to optimize a selected fiber-amplifier output polarization state by controlling the polarization of the input signal seed. In the sample arm, the output beam is sent through a pinhole and monitored for both spatial-mode and PER variations that indicate the onset of MMI.

In general, in the absence of MMI the optical power through the pinhole increases linearly with the amplifier output power. At the onset of MIMI, the mean power through the pinhole drops and pulsing can be observed at a frequency in the kilohertz range. Simultaneously, the polarization becomes unstable and the polarization extinction ratio (PER) degrades.

FIGS. 12A and 12B show the mean signal generated by the pinhole photodetector as a function of fiber-amplifier output power for single-wavelength-seeded and dual-wavelength-seeded operation, respectively. The MMI threshold occurs at the knee in the plots. In this set of experiments, it is roughly 465 W for single-wavelength operation and 990 W for dual-wavelength operation. Dual-wavelength seeding increased the MMI threshold by a factor of more than two.

FIG. 13 shows the measured PER as a function of output power from the fiber amplifier. For both single-wavelength-seeded and dual-wavelength-seeded operation, prior to the onset of MMI the PER of the amplifier is above 20 dB. With the onset of MMI the PER is greatly reduced. The drop in the PER of the amplifier output is a second indication of the onset of MMI and confirms the measurements made with the pinhole photodetector, and the benefits of dual-wavelength seeding.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks, or fiber optic networks.

The various methods or processes (outlined herein) may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags, or other mechanisms that establish relationship between data elements.

Also, various inventive concepts may be embodied as one or more methods, of which an example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for optical amplification, the system comprising:
    an optical fiber comprising a core surrounded by a cladding, the core comprising a gain medium characterized by a gain spectrum;
    a seed light source, in optical communication with the core, to transmit seed light, at a first wavelength in the gain spectrum, into the core of the optical fiber so as to amplify the seed light, the seed light having a first linewidth greater than 100 MHz;
    a control light source, in optical communication with the core, to transmit control light, at a second wavelength in the gain spectrum, into the core so as to reduce a peak rate of heat deposition per unit length along the optical fiber, the control light having a second linewidth greater than 100 MHz; and
    a pump source, in optical communication with the optical fiber, to transmit pump light at a pump wavelength into the fiber so as to pump the gain medium and amplify the seed light.

2. The system of claim 1, wherein the optical fiber comprises a multimode optical fiber and the system is configured to reduce a multimode instability of the seed light and output a fundamental transverse mode of the seed light.

3. The system of claim 1, wherein the optical fiber comprises at least one of a photonic crystal fiber, a chirally coupled core fiber, a trench fiber, or a leaky channel fiber.

4. The system of claim 1, wherein the optical fiber comprises a double-clad optical fiber.

5. The system of claim 4, wherein the core of the optical fiber is doped with Yb, the first wavelength is in a range from about 1040 nm to about 1080 nm, the second wavelength is in a range from about 1025 nm to about 1045 nm, and the pump wavelength is in a range from about 900 nm to about 985 nm.

6. The system of claim 1, wherein the seed light source comprises:
    a laser to produce the seed light; and
    a spectral broadening element, in optical communication with the laser, to increase the first linewidth of the seed light to greater than 100 MHz.

7. The system of claim 6, wherein the spectral broadening element comprises a phase modulator.

8. The system of claim 1, wherein the seed light, the control light, and the pump light are coupled into a first end of the fiber.

9. The system of claim 1, wherein the first linewidth is greater than a Brillouin gain bandwidth of the optical fiber.

10. The system of claim 1, wherein the first linewidth is greater than 1 GHz.

11. The system of claim 1, wherein the control light comprises amplified spontaneous emission.

12. The system of claim 11, wherein the seed light is amplified in an optical amplifier and the control light is generated in the optical amplifier.

13. The system of claim 1, wherein the control light source comprises:
 a laser to produce the control light; and
 a spectral broadening element to increase the second linewidth of the control light to greater than 100 MHz.

14. The system of claim 1, wherein the second linewidth is greater than a Brillouin gain bandwidth of the fiber.

15. The system of claim 1, wherein the second linewidth is greater than 1 GHz.

16. A method of amplifying light, the method comprising:
 propagating seed light at a first wavelength in a core of an optical fiber comprising a gain medium so as to amplify the seed light, the seed light having a first linewidth greater than 100 MHz;
 propagating control light at a second wavelength shorter than the first wavelength in the core of the optical fiber so as to reduce a peak rate of heat deposition per unit length along the optical fiber, the control light having a second linewidth greater than 100 MHz; and
 coupling pump light, at a third wavelength shorter than the second wavelength, into the optical fiber so as to pump the gain medium and amplify the seed light.

17. The method of claim 16, further comprising:
 adjusting a first power of the seed light and/or a second power of the control light so as to reduce a multimode instability of the seed light and amplify the seed light.

18. The method of claim 17, wherein amplifying the seed light comprises amplifying a fundamental transverse mode of the seed light.

19. The method of claim 16, further comprising:
 generating the seed light using a laser; and
 broadening the first linewidth of the seed light to more than 100 MHz.

20. The method of claim 19, wherein broadening the first linewidth comprises transmitting the seed light through a phase modulator.

21. The method of claim 16, further comprising:
 generating the control light from amplified spontaneous emission.

22. The method of claim 21 further comprising:
 amplifying the seed light with an optical amplifier, and wherein generating the control light comprises collecting the amplified spontaneous emission from the optical amplifier.

23. The method of claim 16, further comprising:
 generating the control light using a laser; and
 broadening the second linewidth of the control light to more than 100 MHz.

24. An optical amplifier comprising:
 a large-mode-area (LMA) optical fiber comprising a Yb-doped gain medium;
 a seed light source, in optical communication with the LMA optical fiber, to transmit seed light, at a first wavelength in a range from about 1040 nm to about 1080 nm, into a core of the LMA optical fiber so as to amplify the seed light, the seed light having a first linewidth greater than 100 MHz;
 a control light source, in optical communication with the LMA optical fiber, to transmit control light, at a second wavelength shorter than the first wavelength and in a range from about 1025 nm to about 1045 nm, into the core of the LMA optical fiber so as to reduce the peak rate of heat deposition per unit length along the LMA fiber and mitigate a multimode instability of the seed light, the control light having a second linewidth greater than 100 MHz; and
 a pump source, in optical communication with the LMA optical fiber, to transmit pump light, at a pump wavelength in the range from about 900 nm to about 985 nm, into the LMA optical fiber so as to pump the gain medium and amplify the seed light.

* * * * *